US00RE43566E

(19) United States
(12) Reissued Patent
Golden et al.

(10) Patent Number: US RE43,566 E
(45) Date of Reissued Patent: Aug. 7, 2012

(54) METHOD AND APPARATUS FOR PROVIDING GUARANTEED QUALITY/CLASS OF SERVICE WITHIN AND ACROSS NETWORKS USING EXISTING RESERVATION PROTOCOLS AND FRAME FORMATS

(75) Inventors: Michael E. Golden, Sedona, CA (US); William A. Rundquist, Livermore, CA (US)

(73) Assignee: Corps of Discovery Patent Holding LLC, Bellevue, WA (US)

(21) Appl. No.: 11/129,747

(22) Filed: May 13, 2005

Related U.S. Patent Documents

Reissue of:
(64) Patent No.: 6,563,793
Issued: May 13, 2003
Appl. No.: 09/200,161
Filed: Nov. 25, 1998

(51) Int. Cl.
*H04L 12/28* (2006.01)
*H04L 12/66* (2006.01)

(52) U.S. Cl. ..... 370/236; 370/355; 370/395.2; 370/401; 370/428; 370/477; 709/227; 709/238

(58) Field of Classification Search ..... 370/236, 370/355, 395.2, 401, 428, 477; 709/227, 709/238

See application file for complete search history.

(56) References Cited

U.S. PATENT DOCUMENTS 4,837,858 A * 6/1989 Ablay et al. ..... 455/509
5,258,979 A 11/1993 Oomuro et al.
5,499,290 A * 3/1996 Koster ..... 379/242
5,600,641 A * 2/1997 Duault et al. ..... 370/400
5,731,901 A 3/1998 Kim
5,732,078 A 3/1998 Arango ..... 370/355
5,777,969 A 7/1998 Tomiyama et al.
5,781,537 A 7/1998 Ramaswami et al. ..... 370/254
(Continued)

FOREIGN PATENT DOCUMENTS

EP 0336598 3/1989
(Continued)

OTHER PUBLICATIONS

Seaman, M. et al., Integrated Service Mappings on IEEE 802 Networks, Internet Draft, pp. 1-10, (Nov. 1997).

(Continued)

*Primary Examiner* — Alpus H Hsu
(74) *Attorney, Agent, or Firm* — Stolowitz Ford Cowger LLP

(57) ABSTRACT

A method and apparatus provide reserved bandwidth and QOS/COS virtual circuit connections in a network using both conventional and novel reservation protocols and frame formats. An apparatus according to the invention includes an enterprise control point that communicates with switches via a reserved signaling channel. The switches have been upgraded or replaced to include enhanced functionality. The enhanced switches detect packets that include requests for reserved connections according to existing reservation protocols such as RSVP and IEEE 802.1P/Q. Such detected packets are forwarded to the enterprise control point for processing via a reserved signaling channel. The enterprise control point identifies a path within the network that can satisfy the requested QOS/COS and reserves the requested resources all along the path from beginning to end. A method according to the invention includes detecting packets that include requests for reserved connections according to existing reservation protocols such as RSVP and IEEE 802.1P/Q, forwarding detected packets to an enterprise control point for processing via a reserved signaling channel, identifying a path within the network that can satisfy the requested QOS/COS and reserving the requested resources all along the path from beginning to end.

63 Claims, 13 Drawing Sheets

U.S. PATENT DOCUMENTS

| | | | | |
|---|---|---|---|---|
| 5,802,174 | A | 9/1998 | Sako et al. | |
| 5,867,495 | A | 2/1999 | Elliott et al. | |
| 5,903,559 | A | 5/1999 | Acharya et al. | 370/355 |
| 5,940,372 | A | 8/1999 | Bertin et al. | |
| 5,953,338 | A | 9/1999 | Ma et al. | |
| 6,021,263 | A | 2/2000 | Kujoory et al. | 395/200.62 |
| 6,028,862 | A | 2/2000 | Russell et al. | 370/397 |
| 6,094,431 | A * | 7/2000 | Yamato et al. | 370/395.21 |
| 6,141,339 | A * | 10/2000 | Kaplan et al. | 370/395.61 |
| 6,195,355 | B1 * | 2/2001 | Demizu | 370/397 |
| 6,195,714 | B1 * | 2/2001 | Li et al. | 710/31 |
| 6,226,263 | B1 | 5/2001 | Iwase et al. | |
| 6,272,127 | B1 | 8/2001 | Golden et al. | |
| 6,310,889 | B1 * | 10/2001 | Parsons et al. | 370/466 |
| 6,385,198 | B1 * | 5/2002 | Ofek et al. | 370/389 |
| 6,400,681 | B1 | 6/2002 | Bertin et al. | 370/218 |
| 6,452,924 | B1 | 9/2002 | Golden et al. | |
| 6,470,010 | B1 * | 10/2002 | Szviatovszki et al. | 370/356 |
| 6,470,029 | B1 * | 10/2002 | Shimizu | 370/468 |
| 6,760,289 | B1 | 7/2004 | Ide | |
| 6,917,480 | B2 | 7/2005 | Cheong et al. | |
| 6,937,566 | B1 * | 8/2005 | Forslow | 370/231 |
| 2002/0159391 | A1 * | 10/2002 | Demizu | 370/235.1 |
| 2003/0039237 | A1 * | 2/2003 | Forslow | 370/352 |
| 2004/0109401 | A1 | 6/2004 | Ogasawara | |

FOREIGN PATENT DOCUMENTS

| | | |
|---|---|---|
| EP | 0674459 | 9/1995 |
| EP | 0751517 | 1/1997 |
| EP | 0753979 | 1/1997 |
| EP | 0812089 | 12/1997 |
| EP | 0844612 | 5/1998 |
| EP | 1739906 | 10/1998 |
| EP | 0753952 | 6/1999 |
| EP | 1138139 | 10/2001 |
| EP | 1523000 | 4/2005 |
| GB | 2331659 | 5/1999 |
| JP | 11-112560 | 10/1977 |
| JP | 06-162512 | 6/1994 |
| JP | 07-66834 | 3/1995 |
| JP | 7-066834 | 3/1995 |
| JP | 8-191308 | 7/1996 |
| JP | 08191308 | 7/1996 |
| JP | 9-017119 | 1/1997 |
| JP | 9-18489 | 1/1997 |
| JP | 09018489 | 1/1997 |
| JP | 09-46367 | 2/1997 |
| JP | 10-70571 | 3/1998 |
| JP | 10-173662 | 6/1998 |
| JP | 10-313316 | 11/1998 |
| WO | 97/09716 | 3/1997 |
| WO | 98/31011 | 7/1998 |
| WO | WO 98/37730 | 8/1998 |
| WO | WO 98/47309 | 10/1998 |
| WO | 99/25096 | 5/1999 |
| WO | 99/53719 | 10/1999 |
| WO | WO 00/31929 | 6/2000 |

OTHER PUBLICATIONS

Ghanwani, A. et al., A Framework for Provising integrated Services Over Shared and Switched IEEE 802 LAN Technologies, Internet Engineering Task Force, Internet Draft, pp. 1-43 (May 1998).

Yavatkar, R. et al., SBM (Subnet Bandwidth Manager): A Protocol for RSVP-based Admission Control Over IEEE 802-style networks, Internet Engineering Task Force, Internet Draft, pp. 1-61, (Nov. 1998).

Rosen, E. et al., Multiprotocol Label Switching Architecture, Network Working Group, Internet Draft, pp. 1-58, (Jul. 1998).

Callon, R. et al., A Framework for Multiprotocol Label Switching, Network Working Group, Internet Draft, pp. 1-58, (Nov. 1997).

Braden, R. et al., Resource ReSerVation Protocol (RSVP)—Version 1 Functional Specification, Network Working Group, pp. 1-99, (Sep. 1997).

Bernet, Y. et al., A Framework for Use of RSVP with Diff-serv Networks, Internet Engineering Task Force, Internet Draft, pp. 1-19, (Jun. 1998).

Bernet, Y. et al., A Framework for Differentiated Services, Interent-Draft, Diffserv Working Group, pp. 1-25, (May 1998).

Katsumata, et al., "Proposal regarding Band Management Function for Ensuring Improved Communications Quality," Technical Report by the Institute of Electronics, Information & Communication Engineers of Japan, IN97-168, Feb. 1998, pp. 57-62. Partial English Translation Available.

Obana, et al., "Active Network: Information Processing Using Network in Custom-Made Manner", Information Processing, Jun. 1999, vol. 40, No. 6, pp. 590-595. Abstract.

Iimori, et al., "Low Cost QoS Guarantee Schemes in a Global Networking Service Platform", the Institute of Electronics, Information & Communication Engineers of Japan, Collection 2 of Treatises Reported at the Communications Society Assembly of 1997, Sep. 1997, p. 182 (B-7-104). Partial English Translation Available.

Hayashida, "Tag Switching that Enables Multi-layer Switching", Computer & Network LAN, Dec. 1, 1996, vol. 14, No. 12, pp. 19-23. Partial English Translation Available.

Teagarden, E., "Prioritization: The Best Networking Policy", Data Communications, Vol. 23, No. 2, Jan. 21, 1994, pp. 59-61. XP000418330.

Mohammad Peyravian, "Providing Different Levels of Network Availability in High-Speed Networks," Proceedings of the Global Telecommunications Conference (Globecom). San Francisco, Nov. 28-Dec. 2, 1994, vol. 2, Nov. 28, 1994, pp. 941-945, XP000488676. Institute of Electrical and Electronics Engineers.

Sriram K, "Methodologies for Bandwidth Allocation, Transmission Scheduling, and Congestion Avoidance in Broadband ATM Networks." Computer Networks and ISDN Systems, vol. 26, No. 1, Sep. 1, 1993, pp. 43-59, XP000390600.

Mehra A, et al., "Structuring Communication Software for Quality of Service Guarantees" IEEE Transactions on Software Engineering, vol. 23, No. 10, Oct. 1, 1997, pp. 616-634, XP000728457.

Cidon, I, et al., "Connection Establishment in High-Speed Network," IEEE/ACM Transactions on Networking, vol. 1, No. 41 Aug. 1993, pp. 469-481, XP000415370.

Arango, M, et al. "Guaranteed Internet bandwidth" Global Telecommunications Conference 1996. Globecom '96, Communications: the Key to Global Prosperity London, UK Nov. 18-22, 1996, New York, NY, USA, IEEE, US, vol. 2, Nov. 18, 1996. pp. 862-866. XP010220046.

Woodworth, C, et al, "Connection request protocol (CRP) for IP over ATM" Global Telecommunications Conference, 1996. Globecom '96. Communications: the Key to Global Prosperity London, UK Nov. 18-22, 1996, New York, NY, USA, IEEE, US, vol. 2, Nov. 18, 1996. pp. 476-483, XP010220401.

Decision of Rejection dated Oct. 25, 2004, in Japanese Patent Application No. 2000-584648, 3 pages.

Examination Report; European Application No. 99 917 386.7—1249; Jan. 12, 2005; 4 pages.

Response to Examination Report; European Application No. 99 917 386.7—1249; Jun. 27, 2005; 17 pages.

European Search Report; European Application No. 06 01 7486; Mar. 29, 2007; 5 pages.

Examination Report; European Application No. 99 965 834.7—1244; Oct. 11, 2005; 10 pages.

Response to Examination Report Mailed Oct. 11, 2005; European Application No. 99 965 834.7—1244; Feb. 15, 2006; 15 pages.

Examination Report; European Application No. 99 965 834.7—1244; Mar. 30, 2006; 7 pages.

Response to Examination Report Mailed Mar. 30, 2006; European Application No. 99 965 834.7—1244; Jul. 12, 2006; 17 pages.

Official Action in Japanese Patent Application No. 2000-544156; Mailed Nov. 22, 2005; English Translation Available.

Decision of Rejection in Japanese Patent Application No. 2000-544156; Mailed Mar. 28, 2006; English Translation Available.

Pre-Appeal Examination Report in Japanese Patent Application No. 2000-544156; Notice Date: Feb. 9, 2007. English Translation Available.

Response to Communication under Rule 51(4) Dated Jun. 25, 2007; European Application No. 99 965 834.7; Feb. 5, 2008; 22 pages.

Detti et al.; "Supporting RSVP in a Differentiated Service Domain: an Architectural Framework and a scalability Analysis" ICC '99, 1999 IEEE International Conference on Communications; Vancouver, Canada, Jun. 6-10, 1999; pp. 204-210.
Rothermel K et al.; QoS Negotiation and Resource Reservation for Distributed Multimedia Applications; Mulitmedia Computing and Systems 1997 Proceedings, IEEE International Conference Ottawa, ONT, Canada; Jun. 3, 1997; pp. 319-326.
European Patent Office; Extended Search Report EP application 08102109.9; dated Oct. 15, 2010; 11 Pages.
International Search Report for PCT/US99/27375; Date mailed Aug. 11, 2000.
Davie, B. et al., Internet draft: draft.ieft.mpls-rsvp-00.txt; Mar. 1998.
Viswanathan, et al., Internet draft: viswanathan-mpls-rsvp-00.txt; Aug. 1997.
Stolowitz Ford Cowger Listing of Related Cases, Jul. 7, 2010.
Ghanwani, A. et al., *A Framework for Providing Integrated Services Over Shared and Switched IEEE 802 LAN Technologies,* Internet Engineering Task Force, Internet Draft, pp. 1-43, (May. 1998).
Yavatkat, R. et al., *SBM (Subnet Bandwidth Manager): A Protocol for RSVP-based Admission Control Over IEEE 802-style networks,* Internet Engineering Task Force, Internet Draft, pp. 1-61, (Nov. 1998).
Braden, R. et al., *Resource ReSerVation Protocol (RSVP)—Version 1 Functional Specification,* Network Working Group, Request for Comments 2205, Category: Standards Track, pp. 1-99, (Sep. 1997).
Bernet, Y. et al., *A Framework for Differentiated Services,* Internet-Draft, Diffserev Working Group, pp. 1-25, (May 1998).

* cited by examiner

CONNECTION MONITOR
62
PERMANENT CONNECTION RECORDS
65
CURRENT CONNECTION LIST
63
SIGNALING INTERFACE
66
56
CONNECTION CONTROLLER
64
POLICIES LIST
61
PATH/LIST
59
PATH/DEVICE DISCOVERY
60
NETWORK ELEMENTS REGISTRY
57
50

52,54,56
SWITCH ENGINE
70
SWITCH TABLE
69
RESERVATION INTERFACE
68
CONNECTION PAIRS LIST
67
50
56

METHOD AND APPARATUS FOR PROVIDING GUARANTEED QUALITY/CLASS OF SERVICE WITHIN AND ACROSS NETWORKS USING EXISTING RESERVATION PROTOCOLS AND FRAME FORMATS

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to a method and apparatus for providing guaranteed quality and/or class of service (QOS/COS) in a local or wide area network or across networks, and more particularly, to a technique for adapting an existing packet-switched/routed infrastructure so that on-demand reserved-bandwidth virtual circuit connections with guaranteed QOS and/or COS between any endstations within the network or between networks can be established, while providing interoperation with and improving the performance of existing reservation protocols and frame formats.

2. Description of the Related Art

The Internet has traditionally provided support for "best effort" traffic only. That is, traffic will be propagated along a path from a source to a destination depending on the congestion or lack thereof existing at each "hop" (typically a router) along the way. If there is little congestion, the traffic will be propagated quickly. If the path is heavily congested, traffic will be buffered (usually first-in-first-out) at congested locations until propagation is possible, which may substantially delay the traffic. Moreover, there is no way for a sender to know ahead of time whether the desired transmission will succeed or fail. This is because Internet traffic follows a "thread-the-needle" approach, wherein each hop or router knows only about the next hop downstream. If traffic at the next hop is extremely congested, the router will nevertheless attempt to forward traffic thereto without searching for an alternate route around it. If the traffic can't be forwarded within a timeout period, the transmission will fail.

The existing Internet "best effort" design is suitable for low priority traffic where transmission latency is acceptable, albeit annoying. However, with the proliferation of new technologies using real time applications such as video conferencing and Internet telephony, guaranteed quality of service (QOS) with minimal and predetermined transmission latency has become increasingly desired. Such service is not possible with the traditional "best effort" design.

Recently, protocol-based QOS solutions have been attempted. One such solution is Resource Reservation Protocol (RSVP), which is an application layer protocol. This is illustrated in FIG. 1. Downstream messages along the path from a sender S1 to remote receivers RCV1, RCV2 and RCV3 include Path, PathTear, ResvErr, and ResvConf. Upstream messages along the path from receivers RCV1, RCV2 and RCV3 to sender S1 include Resv, ResvTear and PathErr.

A sender S1 desiring to establish a connection having a specified bandwidth or latency with remote receivers RCV1, RCV2, and RCV3 issues a Path message to the receivers. The Path message must be processed at each hop or router R1, R2, R3, R4 in the path between the sender and the respective receiver. Each receiver RCV1, RCV2, RCV3 determines the type or amount of service that will be required for the connection from the Adspec object of the Path message and responds with a Resv message of its own having parameters defining the required service. The Resv message is threaded back upstream along the identical path by which the Path message was sent. Each router must determine whether it has the resources to satisfy the required reservation. If so, it reserves the connection in its path state, and forwards the Resv message back upstream. If it doesn't have the required resources, it returns an error message back downstream toward the appropriate receivers. RSVP is described in R. Braden et al., "Resource ReSerVation Protocol (RSVP)—Version 1 Functional Specification," RFC 2205, September 1997. In order to work effectively, obviously, every router at each hop along the path between sender and receiver must support RSVP.

RSVP is designed for reserving resources along paths stretching across multiple networks. Since it is an application layer protocol, it can not be understood or implemented in layer 2 devices such as switches within a local network that often separate a sender or receiver from their gateways to other networks. Accordingly, even if RSVP were fully supported between all networks, reserved connections established using it would still be prone to congestion problems within the local networks of the sender and receiver.

Moreover, other protocols have been or are in the process of being developed to improve and provide differentiated classes of service (COS) between networks, and attempts have been made to integrate these proposals with RSVP. Multiprotocol Label Switching (MPLS) is a scheme in which labels are associated with streams of packets between communicating hosts. These labels are used by MPLS-capable routers in the path between the hosts to cause all packets in the stream to be forwarded the same way. This further allows hosts to use predetermined explicit routing. MPLS is described in R. Callon et al., "A Framework for Multiprotocol Label Switching," Network Working Group Internet-Draft, Nov. 21, 1997. When integrated with RSVP, the labels are carried in RSVP objects within Path and Resv messages.

Differentiated Services (diff-serv) allows definition and selection of different discrete levels of service. Rather than assigning the required level of service on a per-flow basis as in RSVP, diff-serv assigns levels of service on a per-packet basis in accordance with the contents of a DS field in each packet's header. Accordingly, when used in conjunction with RSVP, means must be provided for marking the DS fields in transmitted packets appropriately for each flow. Diff-serv is described in Y. Bernet et al., "A Framework for Differentiated Services," Diff-serv Working Group Internet-Draft, May 1998.

MPLS and diff-serv are two different competing approaches for providing COS using RSVP signaling. However, the two approaches are incompatible. Accordingly, frames of packets sent using one format will not be accorded the desired level of service over devices only supporting the other format.

Moreover, there is no way that MPLS and diff-serv can know, ahead of time, whether or not the requested COS signaled in the frames can be effected through all forwarding devices from source to destination. This is because they suffer from relying on RSVP as the signaling protocol since its thread-the-needle approach can't see the whole network. This weakness centers around comingled best effort traffic. Without strict control mechanisms which can limit the impact on a piece of network equipment, it is not possible to implement true QOS/COS since the best effort traffic, even though it may be in different queues or on different physical interfaces, can still consume routine resources within the router which in turn can add unpredicted latency to the QOS/COS traffic, thus having a negative impact on the delivery and therefore the quality and/or level of the service.

The basic issue is that RSVP-controlled devices are generally packet switches. Every packet switch introduces jitter. In an RSVP-controlled device (which can be a "switch" or a "router"), packets arriving on a port are commingled; each packet may belong to any priority. There are two basic designs for controlled-QOS switching systems: input-queuing and output-queuing. If the switch is "input-queueing", each packet is classified onto one of several input queues on the arriving port of the switch. There needs to be one queue per level of service supported, or various levels of service will be commingled in that queue. Depending on the switch design, each packet may be "targeted" to an output port upon queueing, or that may be done at a later stage.

In an input-queued design, the output port polls each queue that might have traffic for that output port when the port becomes available. With QOS handling, it handles higher priority queues before lower priority queues. Now, presume the output port is reading out a long, low priority packet. A high priority packet arrives, and is queued. The high priority packet can not be transmitted until the lower priority packet is completely sent. This causes the high priority packet to "jitter"; i.e., it takes longer to get through the router than one that arrived without a low-priority packet being transmitted. In fact, it can cause "convoying", the behavior of several high priority packets backing up while waiting for the low-priority traffic to clear.

Output-queued packet switches have similar problems. Such problems are caused by the fundamental notion of packet switching: all packets must be transmitted whole. All packet switches cause some amount of jitter in the transmission path; that's why there's a maximum packet size. Control of end-to-end jitter was the biggest reason for choosing the outrageously small maximum packet size (so small, they called it a "cell") for ATM.

One approach to solve the issue of latency is to use a TDM switch. In a TDM switch, all bytes are transmitted synchronously, and no queueing is necessary for completion of the packet. Therefore, a TDM switch provides constant latency, for all traffic. Using a TDM switch, however, sacrifices the ability to multiplex variable speed traffic.

RSVP is mainly intended for communications between hosts in different networks. Meanwhile, within networks, data link layer QOS/COS solutions have been proposed. In particular, for IEEE 802 class LANs (the most common), the revised IEEE 802.1D data link layer frame format defines static priority queueing for switches that implement multiple queues. IEEE 802.1D is described in "MAC Bridges," ISO/IEC 10038, ANSI/IEEE Std 802.1D (1993). More recently, IEEE 802.1P/Q proposes differential traffic class queueing and access to media based on a "user_priority" signaled in frames. This is described in "IEEE Standards for Local and Metropolitan Area Networks: Virtual Bridged Local Area Networks," Draft Standard P802.1Q/D9, Feb. 20, 1998. Layer 2 devices supporting such frame formats queue traffic for forwarding between ports with different levels of priority, thereby permitting high priority traffic to propagate with minimal latency, while preserving "best effort" transmission of lower priority traffic.

Realizing that the LAN is often the first and last "hop" between a sender and receiver, RSVP proponents have attempted to marry the reservation functions of the application layer with the priority queueing of the IEEE 802.1P/Q data link layer for the purpose of establishing reserved connections completely end-to-end. Integration of IEEE 802.1-style LANs with Internet level reservation protocols such as RSVP is discussed in an IETF Draft by A. Ghanwani et al. entitled "A Framework for Providing Integrated Services Over Shared and Switched IEEE 802 LAN Technologies," March 1998. This proposed framework includes a Bandwidth Manager that acts as a proxy between IEEE 802.1P/Q traffic on the LAN/MAN and RSVP traffic on the WAN or Internet. A proposed Bandwidth Manager consistent with the proposed framework is described in an IETF Draft by R. Yavatkar et al. entitled "SBM (Subnet Bandwidth Manager): A Protocol for RSVP-based Admission Control over IEEE 802-style networks," March 1998.

FIG. 2 illustrates a centralized implementation of the bandwidth manager described by Ghanwani. In this implementation, the bandwidth manager 10 includes a bandwidth allocator module that is responsible for admission control for an entire subnet (i.e., a layer 2 domain in which traffic between hosts therein does not require a layer 3 forwarding function). Since bandwidth manager 10 is colocated with a layer 2 device, signaling between it and host 12 and router 14 is performed at the data link layer (layer 2).

As shown, host 12 is separated from router 14 by one or more IEEE 802.1P/Q switches or bridges 16. When a sender in another network desires to reserve a session with host 12 as a receiver, the Path message from the sender reaches router 14. Apart from support for the normal RSVP processing, router 14 includes a requestor module that maps the application layer address of the host 12 to its layer 2 address and formats an extended Path message to be sent to host 12 via bandwidth manager 10. Bandwidth manager 10 receives this extended Path message and the bandwidth allocator module builds its own path state for the connection and forwards the message to host 12, thus inserting itself as the last "hop" on the path.

When host 12 returns a Resv message to bandwidth manager 10, the bandwidth allocator determines whether to admit the connection through the subnet. This involves determining whether enough resources are available to handle the required level of service. If not, an error message is returned to the receiver. If sufficient resources are available, the Resv message is forwarded upstream to router 14 and from thence to the sender. The bandwidth allocator maps the required quality of service into a particular traffic class that has a corresponding priority that is designed to accomplish the desired service. Based on this mapping, the bandwidth manager tells host 12 and router 14 the user_priority with which to specify in the layer 2 frames in order to accomplish the required level of service. Traffic belonging to the session within the network is thus formatted into layer 2 frames that are forwarded between host 12 and router 14 by switches 16, with a priority that is aimed at effecting the required quality of service.

Problems remain. SBM sees only resources within its subnet—it has no overview of path from beginning to end across different networks. SBM is unable to deal with resources individually, and unable to manage resources as a whole. SBM further requires that extensions be made to RSVP in order for its services to be supported—if these extensions are not used, SBM can not assist the connection. Moreover, this approach for supplying QOS within networks requires using IEEE 802.1P/Q, which further requires extended frame format not compatible with previous frame formats. Thus it requires switches that support IEEE 802.1P/Q and/or multiple queues. Likewise, SBM requires endstations that support IEEE 802.1P/Q. Further, switches within a network will suffer the commingling best effort traffic problems described above with respect to RSVP.

Co-pending U.S. patent application Ser. No. 09/060,520, filed Apr. 14, 1998 entitled "Method and Apparatus for Providing Guaranteed Quality of Service in a Local or Wide Area Network," commonly owned by the assignee of the present invention, the contents of which are incorporated herein by reference, solved the problem of providing guaranteed quality of service in a network without fundamentally altering the network infrastructure or requiring frame format or other protocol extensions. Although the co-pending application dramatically advances the state of the art, there is still a need to provide interoperation between the concepts and advantages of the co-pending application and existing and emerging intra- and internetwork reservation protocols and frame formats. The present invention fulfills this need, among others.

SUMMARY OF THE INVENTION

Accordingly, an object of the present invention is to provide reserved bandwidth and QOS/COS virtual circuit reserved connections in a local area network using both conventional and novel reservation protocols and frame formats.

Accordingly, an object of the present invention is to provide reserved bandwidth and QOS/COS virtual circuit reserved connections between local area networks using both conventional and novel reservation protocols and frame formats.

Another object of the invention is to provide QOS/COS virtual circuit reserved connections within a network using existing reservation protocols and frame formats that does not require extensions or revisions to such existing protocols and frame formats.

Another object of the invention is to provide QOS/COS virtual circuit reserved connections within a network that does not disrupt the overall network infrastructure.

The present invention achieves these objects and others. According to one aspect of the invention, an apparatus includes an enterprise control point that communicates with switches within a network via a reserved signaling channel. The switches have been upgraded or replaced to include enhanced functionality. The enhanced switches detect packets that include requests for reserved connections according to existing reservation protocols such as RSVP and IEEE 802.1P/Q. Such detected packets are forwarded to the enterprise control point for processing via a reserved signaling channel. The enterprise control point identifies a path within the network that can satisfy the requested QOS/COS and reserves the requested resources all along the path from beginning to end.

According to another aspect of the invention, a method according to the invention includes detecting packets that include requests for reserved connections according to existing reservation protocols such as RSVP and IEEE 802.1P/Q, forwarding detected packets to an enterprise control point for processing via a reserved signaling channel, identifying a path within the network that can satisfy the requested QOS/COS and reserving the requested resources all along the path from beginning to end.

According to a further aspect of the invention, an apparatus according to the invention further includes a network control system server coupled to different local area networks and also coupled to controllable network elements within an interconnection path between the local area networks. Enterprise control points within the network are further adapted to communicate with the network control system server. The network control system server is adapted to identify an interconnection path between the local area networks that can satisfy the requested QOS/COS, the path including one or more controllable network elements, and to switch up the connection between the local area networks.

According to a further aspect of the invention, a method according to the invention further includes forwarding detected requests for reserved connections to a network control system server coupled to different local area networks and also coupled to controllable network elements within an interconnection path between the local area networks, identifying an interconnection path between the local area networks that can satisfy the requested QOS/COS, the path including one or more controllable network elements, and switching up the connection between the local area networks via the identified interconnection path.

BRIEF DESCRIPTION OF THE DRAWINGS

These and other objects and advantages of the present invention will become apparent to those skilled in the art after considering the following detailed specification, together with the accompanying drawings wherein.

DETAILED DESCRIPTION OF THE PREFERRED EMBODIMENTS

The invention will now be described with reference to an exemplary implementation depicted in FIG. 3. In this implementation, LANs A and B are local area networks having enhanced QOS/COS functionality according to the invention, while LAN C is a conventional local area network. Senders and receivers in LANs A, B and C communicate using conventional reservation protocols via the public Internet 24 and/or via a private network or virtual private network 26 (e.g. leased lines, X.25, Frame Relay, ISDN, or ATM). In a manner that will be described in more detail below, such communications will be detected and managed within LANs A and B so as to guarantee the desired QOS/COS within LANs A and B. However, in this example of the invention, the QOS/COS of such communications traversing between LANs A and B and within LAN C will still be prone to lack of support for reservation protocols within the public Internet 24 or private network 26 and/or overall internetwork congestion.

Figure 3:
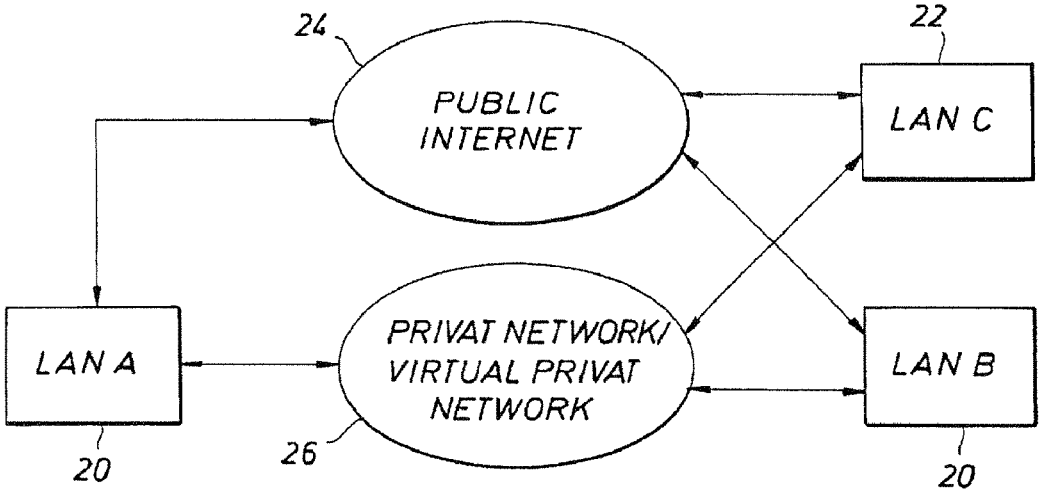
FIG. 3 is a top-level block diagram illustrating an example of the invention adapted for use with LANs interconnected via the public Internet and/or private network /virtual private networks.
Figure 4:
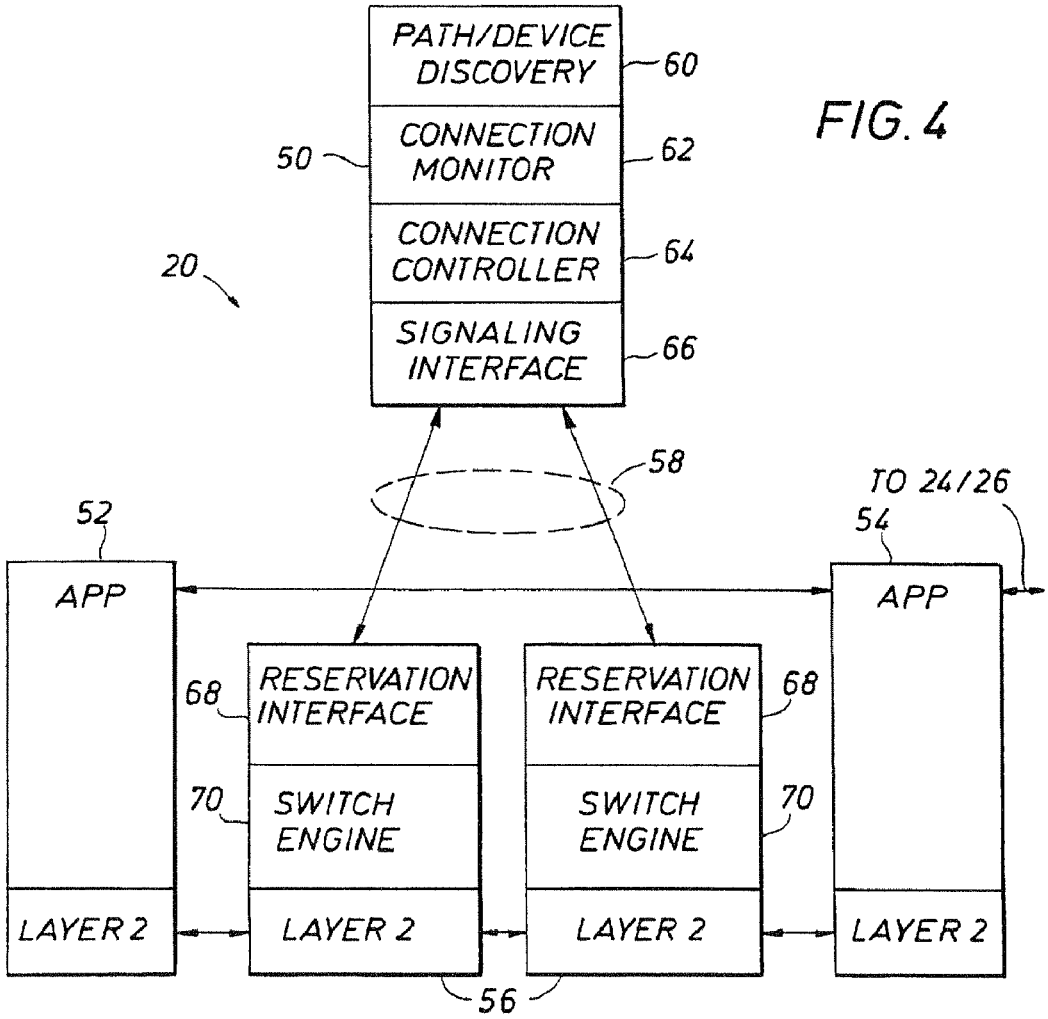
FIG. 4 illustrates a network that provides interoperation with internetwork reservation protocols such as RSVP according to the example of the invention in FIG. 3.

FIG. 4 illustrates portions of a local area network 20 such as LAN A or B in FIG. 3 configured in accordance with the principles of the invention. This embodiment is designed to provide local network interoperation with application layer reservation protocols such as RSVP. As shown, it includes enterprise control point (ECP) 50, host 52, router 54 and intermediate switches 56.

Figure 1:
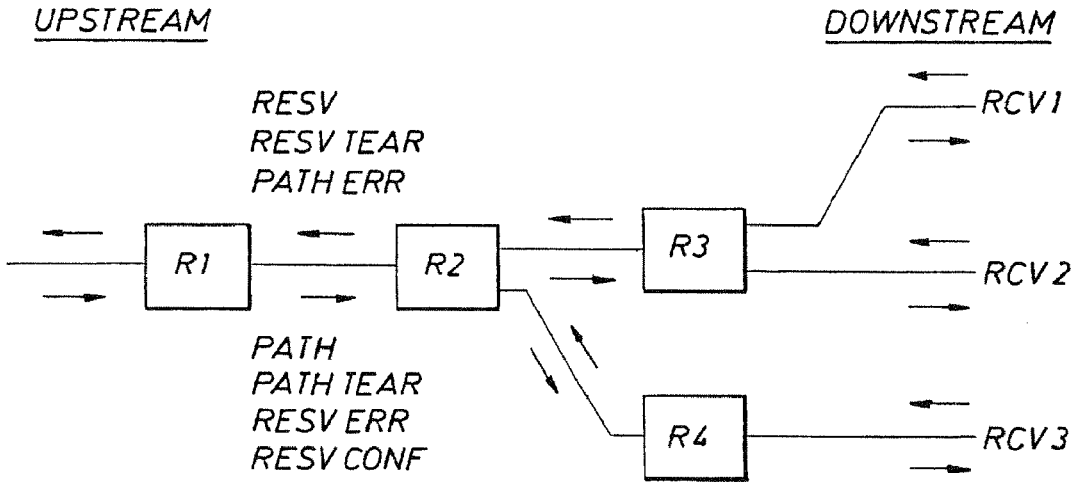
FIG. 1 (PRIOR ART)
FIG. 1 illustrates an example of using RSVP in a conventional multicast session.
Figure 2:
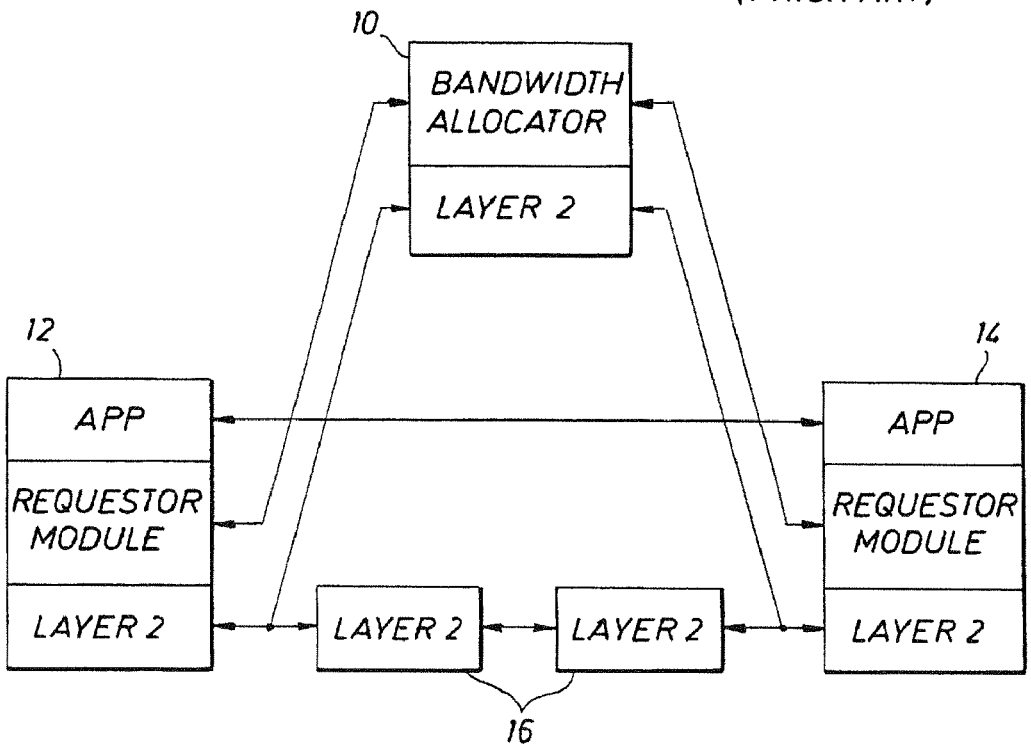
FIG. 2 (PRIOR ART)
FIG. 2 illustrates a conventional framework for providing integrated services in a LAN.

Host 52 and router 54 in the embodiment of the invention shown in FIG. 4 can be any host or router that has the capability of signaling using application layer reservation protocols such as RSVP, unlike the conventional framework in FIG. 2 that requires the host and router to include a requestor module for communicating with the bandwidth manager. For example, host 52 is a conventional workstation such as a PC having an Ethernet network interface card (NIC) such as a Fast EtherLink XL from 3 Com Corp. of Santa Clara, Calif., and running a networking operating system such as Windows NT from Microsoft Corp. of Redmond, Wash., including NIC RSVP client drivers for signaling with RSVP. Router 54 is, for example, a Cisco 7000 multiprotocol router by Cisco Corp. of San Jose, Calif. Intermediate switches 56 are, for example, flash memory upgradable switches such as Layer 2 Etherswitch 1100 switches from 3Com Corp. of Santa Clara, Calif. ECP 50 is either a standalone processor and software that communicates with a switch in network 20 as any other endstation, or it may be incorporated within the existing functionality of an existing switch via a firmware upgrade, for example.

Although the principles of the invention can be applied to internetwork signaling protocols other than RSVP, for clarity only RSVP will be described in detail. Moreover, although only one host 52 and router 54 is shown, it should be apparent that a network can have many hosts and routers that support reservation protocols. It should be likewise apparent that the number of intermediate switches between host 52 and router 54 can be just one, or more than two, although two switches 56 are shown in FIG. 4.

As shown in FIG. 4, ECP 50 includes a path/device discovery function 60, a connection monitor function 62, a connection controller function 64, and a signaling interface function 66. Intermediate switches 56 each include a reservation interface function 68 and enhanced switch engine function 70.

Figures 5, 6:
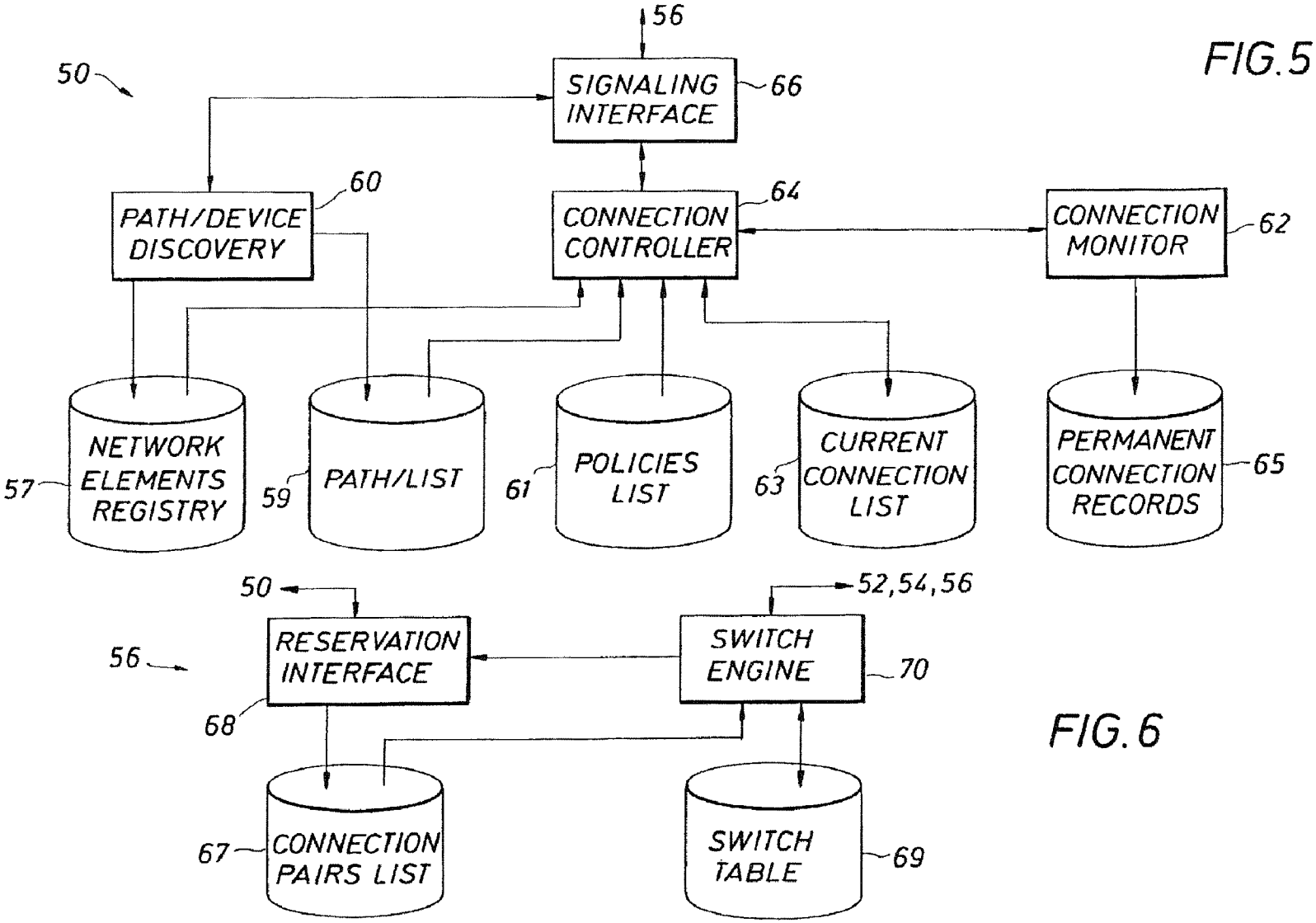
FIG. 5 is a block diagram further illustrating the functionality an ECP adapted for use in a network such as that illustrated in FIG. 4.
FIG. 6 is a block diagram further illustrating the upgraded functionality of a switch adapted for use in a network such as that illustrated in FIG. 4.

As the functionality of ECP 50 is shown in more detail in FIG. 5, signaling interface function 66 provides the ability to communicate with switches 56 via a reserved signaling channel 58 (described in the co-pending application Ser. No. 09/060,520). Path/device discovery function 60 learns what network elements and paths between endstations exist within the LAN and maintains respective lists of each in network elements registry 57 and path list 59. The network elements include endstations such as host 52 and router 54 and switches such as switches 56, as well as the interfaces between them (e.g. switch ports). Information maintained in network elements registry 57 by path/device discovery function 60 for each network element preferably includes their respective MAC addresses and bandwidth capacity. Connection controller function 64 is responsible for setting up and tearing down reserved connections within network 20 in response to sessions using existing and emerging protocols such as RSVP in a manner that will be described in more detail below. Connection monitor function 62 maintains a permanent list of connections, including respective permanent connection records 65 that show the elapsed time of the connection, the parties involved, and the resources used. Such records can be used for billing and resource management, for example.

The functionality of intermediate switches 56 is shown in more detail in FIG. 6. Such switches include switch engine functions for layer 2 forwarding of packets according to conventional techniques. Similarly as described in the co-pending application Ser. No. 09/060,520, however, such switches have been upgraded or replaced so as to include the functionality of the invention. Accordingly, switches 56 include an enhanced switch engine 70 that makes forwarding decisions based on a conventional switch table 69 as well as a novel reserved connection pairs list 67. Enhanced switch engine 70 further includes functionality for detecting packets using reservation protocols such as RSVP and forwarding information concerning them to ECP 50 via reservation interface 68. Moreover, switches 56 include additional functionality in the form of reservation interface function 68 that communicates with ECP 50 via reserved signaling channel 58 to exchange information about reserved connections. The effect of the above-noted enhanced functionality is that switches 56 give higher priority to packets belonging to reserved virtual circuit connections than to other packets contending for access to the same ports as needed by the reserved virtual circuit connections, thereby guaranteeing the desired service for the reserved connections.

It should be apparent to those skilled in the art that switches 56 are not necessarily layer 2 forwarding devices; rather, the enhanced functionality present within switches 56 could be applied to application layer forwarding devices and routers in addition to layer 2 forwarding devices. Hence, the principles of the invention are applicable to environments having a plurality of subnets, or packet-switched WANs (possibly including some or all of private network/virtual private network 26), including a plurality of layer 2 and layer 3 switches and/or routers. However, for simplicity, this example of the invention describes only switches 56 within a common network 20.

As a further alternative, it should be noted that packets using reservation protocols may be intercepted at the host's NIC rather than at switches 56. However, this would require that the NIC be upgraded with such functionality and with an interface to ECP 50.

The details of the operation of a local area network 20 illustrated in FIG. 4 having the additional functionality of the present invention will now be described. More specifically, when host 52 is invited to participate, or requests participation, in a reserved connection with an upstream/downstream host via public Internet 24 or private network/virtual private network 26 based on the conventional RSVP reservation protocol, Path and Resv messages will flow within the network between host 52 and router 54. Such messages will necessarily also have to flow through one or more intermediate switches 56, although the application layer portion of the messages are typically transparent to such switches. In accordance with the invention, however, switches 56 are upgraded to detect RSVP messages and to notify ECP 50 in addition to forwarding them between host 52 and router 54.

More particularly, for example, when a host in another network desires a reserved connection with host 52, a Path message will be routed to router 54 via Internet 24 or private network 26, and router 54 will then insert itself as the final hop of the inter-network path of the requested connection and perform the usual RSVP path state processing. Router 54 will realize from its routing tables that host 52 belongs to the network by which it is connected via intermediate switch 56 and will forward the Path message to switch 56 accordingly. The header of the forwarded Path message will include the layer 2 addresses of host 52 as the destination and router 54 as the source. Switch engine 70 of switch 56 is enhanced to detect such Path messages (e.g. by checking the protocol type in the packet header). When a Path message is detected, switch engine 70 temporarily buffers the message and sends a copy to ECP 50 via reserved signaling channel 58.

Likewise, when host 52 desires a reserved connection with a host in another network, it will send a Path message to its default gateway, in this case router 54. The header of the Path message will thus include the layer 2 addresses of host 52 as the source and router 54 as the destination. Switch engine 70 of switch 56 is enhanced to detect such Path messages. When it does, it temporarily buffers the detected Path message and sends a copy to ECP 50 via reserved signaling channel 58.

When ECP 50 receives a copy of the intercepted RSVP Path message (either from host 52 or router 54), connection controller function 64 looks up the list of available paths between host 52 and router 54 in path list 59. It then determines the overall capacity of the first available path by determining from network elements registry 57 whether the minimum bandwidth available through each link, switch, and switch port in the path will be sufficient to fulfill the bandwidth and/or quality of service requested for the connection. Connection controller function 64 reduces the bandwidth available through each link, switch, and switch port in the path, and thus the overall capacity of the path, in accordance with bandwidth consumed by currently existing connections listed in its current connection list 63. The remaining bandwidth available through each link, switch, and switch port may be further reduced by rules and policies established for the network, such as allowing certain hosts to have priority for reserved bandwidth connections over other hosts, and the like, such rules and policies being stored in its policies list 61. It should be noted that, alternatively or additionally, ECP 50 could communicate with a policy server within the network for further determination on whether to admit the connection.

If the overall capacity of the first available path between host 52 and router 54 is not sufficient for the bandwidth required by the requested connection, the next path in the list is checked (if more than one path exists), and on to the end of the list. It should be noted that some paths in the list may not include the switch that first detected the RSVP Path message, although this will be unlikely if most or all of the switches in the network are upgraded in accordance with the invention. It should be further noted that, preferably, the paths in the path list are ordered by number of hops, the first path having the fewest hops. Accordingly, connection controller function 64 can further include functionality for determining and controlling the maximum latency of the available paths.

If an available path can provide the requested service for the connection, connection controller function 64 sends a bandwidth reservation to each switch 56 in the path via signaling interface function 66 and signaling channel 58. The reservation includes the source and destination of the connection (e.g., the source and destination MAC addresses of host 52 and router 54 if switch 56 is a Layer 2 switch, and perhaps further the source and destination IP addresses of host 52 and router 54 if switch 56 is a Layer 3 switch), and the desired bandwidth in packets per second, for example. Connection controller function 64 then waits for an acknowledgment from each switch 56 to which a reservation request was sent. When all such acknowledgments are received via signaling interface function 66, connection controller function 64 updates the list of existing connections in connections list 63. Connection controller function 64 also alerts connection monitor function 62 that a reserved connection has been established, which creates a record regarding the connection to be stored in permanent connection records list 65.

If connection controller function 64 determines from its above described processing that there exists no path between host 52 and router 54 that can fulfill the requested connection, no special processing will be performed by switches 56, and so packets belonging to the connection will be forwarded with best effort only. Alternatively, connection controller function 64 can go through the list of available paths and find the one having the next highest available capacity. In either event, connection controller function 64 will cause either switch 56 or the downstream one of host 52 and router 54 to send a PathErr message back upstream.

After ECP 50 completes its processing to set up the connection, it sends a message to the switch 56 that intercepted the Path message, causing the switch to forward the buffered Path message along to host 52 (via one or more additional intermediate switches 56 if necessary).

In this example of the invention, no special processing need be performed by switches 56 or ECP 50 for Resv messages corresponding to the intercepted Path message.

Switches 56 also intercept ResvTear and PathTear messages and send copies to ECP 50 for processing in addition to forwarding them on to their upstream or downstream destinations. When such a message is received via signaling interface 58, connection controller 64 finds the connection in its current connection list, deletes the connection and updates the list, notifies connection monitor function 62 that the connection is ending, and sends bandwidth release messages to each switch 56 involved in the connection.

Focusing more particularly on the operation of switches 56 illustrated in FIG. 6 according to the invention, as described above, reservation interface function 68 of each switch 56 receives bandwidth reservation requests from ECP 50 via reserved signaling channel 58. Such requests include, for example, the MAC addresses of host 52 and router 54, as well as the desired bandwidth, in bytes or packets per second for example. Upon receipt of such a request, reservation interface function 68 stores the addresses and desired bandwidth in connection pairs list 67 and sends an acknowledgment to ECP 50. Reservation interface function 68 also receives bandwidth reservation release requests from ECP 50 containing, for example, the MAC addresses of the hosts and routers involved in the virtual circuit connection that is to be released. Upon receipt of such a request, reservation interface function 68 deletes the information in connection pairs list 67 corresponding to the released connection and sends an acknowledgment to ECP 50.

Enhanced switch engine 70, in addition to detecting and processing sessions using existing and emerging reservation protocols such as RSVP as described above, performs conventional functions of forwarding packets between ports of the switch in accordance with addresses in the packet headers and the contents of its standard switch table 69. In accordance with the principles of the invention, however, enhanced switch engine 70 further compares the addresses in the packet headers with the addresses contained in connection pairs list 67. Specifically, if the source and destination addresses of an incoming packet match both addresses of one of the address pairs stored in its connection pairs list, the packet is forwarded to the port associated with the destination address, which port is designated by its conventional switch table 69. Meanwhile, if the port designated by switch table 69 for one address of an incoming packet matches a port designated by the switch table for any of the stored addresses of hosts and routers involved in a reserved virtual circuit connection, but if both addresses of the incoming packet do not match the corresponding address pair stored in its connection pairs list, the packet is dropped (if there exist current active connections in connection pairs list 67 and sufficient port bandwidth is unavailable).

It is important to note that this approach does not compromise the fundamental ability of switch 56 (be it a level 2 switch or level 3 router or switch) to share traffic loads with various classes of traffic. It only gives QOS/COS traffic preferred access to the available bandwidth of a switch or router port. If bandwidth on a port has been reserved by the ECP but priority packets are not arriving to make use of that bandwidth, "best effort" packets can and will be allowed to be forwarded through that port.

As an alternative, if the switch 56 maintains separate port queues for priority traffic, enhanced switch engine 70 can forward reserved connection packets to high priority queues, while dropping or forwarding to lower priority queues those packets which contend for access to ports involved in reserved connections. However, it should be apparent that the invention is operative whether or not such switches maintain more than one port queue per switch port, and whether or not such switches support IEEE 802.1P/Q.

Figure 7:
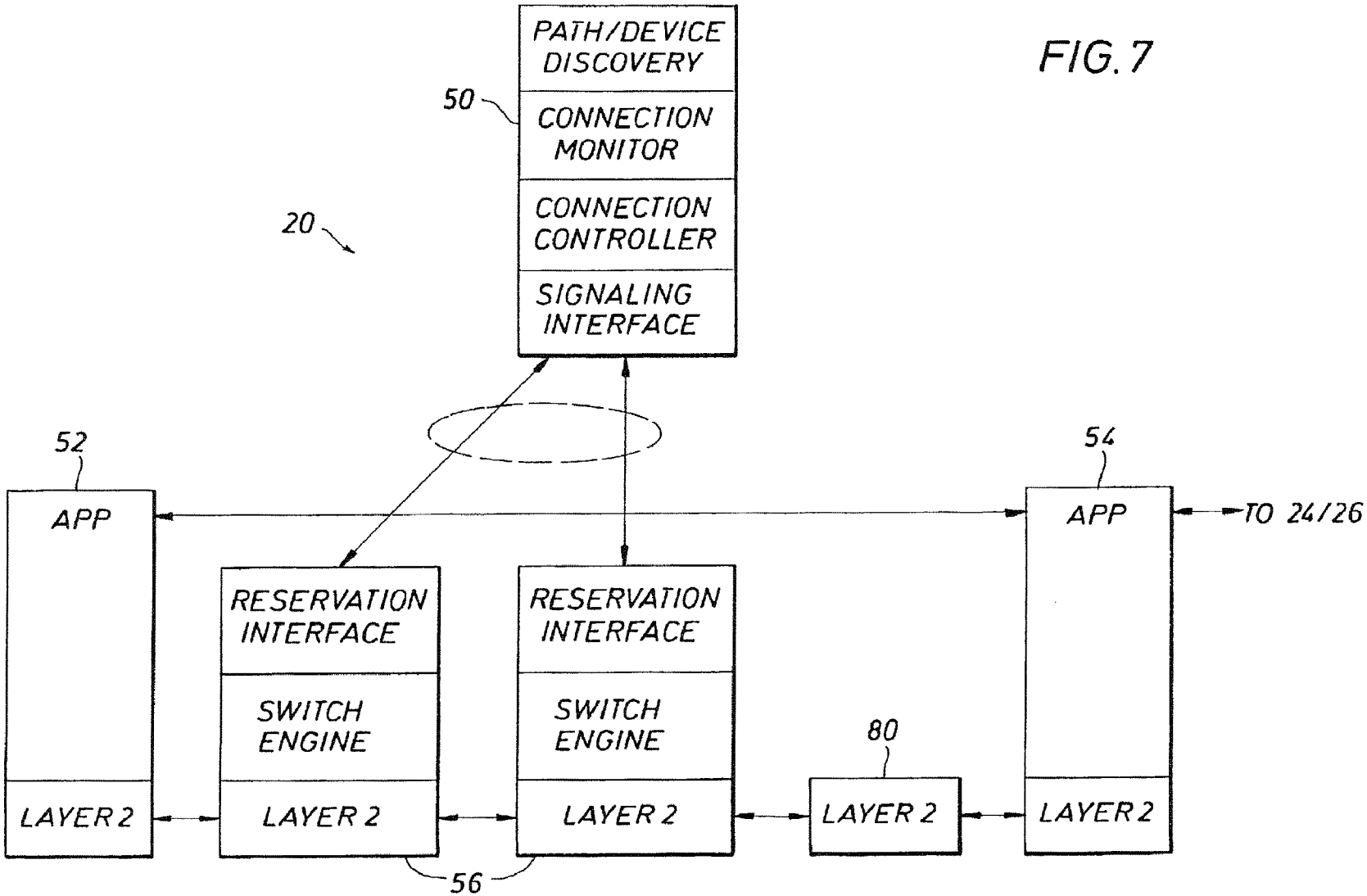
FIG. 7 illustrates another example of a network that provides interoperation with internetwork reservation protocols such as RSVP and that includes both conventional and novel switch services in accordance with the example of the invention in FIG. 3.

It should be noted as in co-pending application Ser. No. 09/060,520, that not every switch in the network need be upgraded. However, the reserved connection features of the invention will be limited to those segments of the path between host 52 and router 54 that are under the control of, and in communication with, ECP 50. Another example of network 20 is shown in FIG. 7 to illustrate this alternative. In this example, switch 80 is a layer 2 switch or bridge that has not been upgraded in accordance with the invention. Nevertheless, the invention is operative to secure or deny reserved connection services through switches 56, although any such reserved connections that are admitted through the network will be prone to possible congestion through switch 80. The switches that have been upgraded in accordance with the invention are thus operative to perform reserved connection features as long as they lie in packet communication with requesting and/or destination hosts or routers, regardless of how many conventional resources lie between the upgraded switches and such hosts and/or routers.

Figure 8:
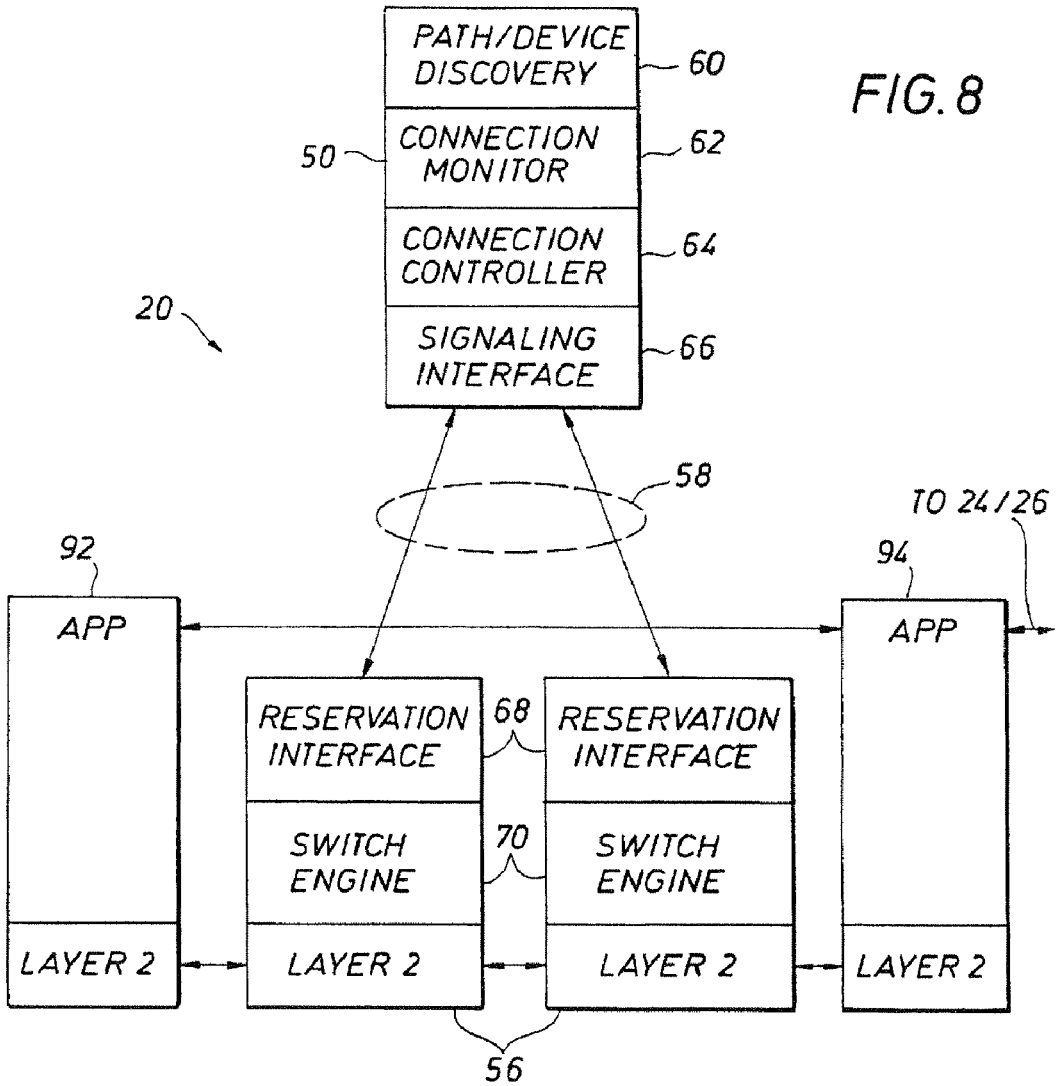
FIG. 8 illustrates another example of a network that provides guaranteed COS while providing interoperation with IEEE 802.1P/Q frame formats in accordance with the example of the invention in FIG. 3.

For traffic within the network, the present invention facilitates interoperation with IEEE 802.1P/Q protocols in much the same manner as with RSVP. Although the IEEE 802.1P/Q protocol does not provide for end-to-end signaling of reservation requests per se, by signaling a desired priority level within the packet, an implicit reservation for a connection with a desired level or class of service (COS) is being made. Another example of a local network 20 having the additional functionality of the invention that provides interoperation with this "reservation protocol" is illustrated in FIG. 8.

Differently from the above-described embodiments, however, hosts 92 and 94 within the same network 20 are not necessarily capable of supporting RSVP, but rather are any hosts that support the IEEE 802.1P/Q protocols in a manner that is conventionally known. Moreover, although hosts 92 and 94 are shown having application layer functionality, this is not necessarily so. Further, as an alternative, one of hosts 92 or 94 may actually be a router that forwards packets from a IEEE 802.1P/Q compliant host in another network via public Internet 24 and/or private network/virtual private network 26 (as indicated by the dashed arrow adjacent to host/router 94).

Intermediate switches 56 detect packets using the extended frame header format of IEEE 802.1P/Q and compare the header information within such packets to information regarding current reserved connections in the switch's connection pairs list 67. The header information will include the source and destination address of the packet and the desired class of service or priority level. If the source and destination within the detected packet header information matches that for a current reserved connection stored in the list, the IEEE 802.1P/Q packet is forwarded in accordance with the priority assigned for that connection. If the header information does not match, the header information is forwarded to ECP 50 via the reserved signaling channel, and the IEEE 802.1P/Q packet is dropped (if there exist current reserved connections stored in list 67 and sufficient port bandwidth is unavailable).

ECP 50 then determines whether a path exists that can provide the requested service (either signaled by the "user_priority" field or by a selected queue) between the source and destination hosts, as described in the forwarded header information. In the process, ECP 50 first maps the requested service level to a bandwidth or latency requirement, for example by using a stored table. If a path exists, ECP 50 establishes the connection by sending bandwidth reservation requests to each switch 56 in the path. If not, packets belonging to the requested connection are dropped or are assigned a priority that corresponds to the maximum available bandwidth.

Each time a packet belonging to a reserved connection is forwarded by switch 56, it resets a flag associated with that connection in connection pairs list 67. Accordingly, switch 56 can also include functionality similar to LRU processing to periodically review the list of reserved connections for inactive sessions. For inactive sessions, a message can be sent to ECP 50 identifying the reserved connection so that ECP 50 can send bandwidth release messages to all switches in the path for that reservation.

There are many advantages that this embodiment of the invention provides over conventional networks supporting IEEE 802.1P/Q. For example, the desired reservation can be maintained consistently throughout the duration of the connection, and for each switch from host to host along the path. In contrast, in conventional networks, reserved connections must still contend for access to ports with other connections having the same or higher priority, even if such contending connections were established after the reserved connection. Moreover, switches 56 need not support multiple queues per switch port, as is required to effectuate QOS in conventional networks.

Figure 9:
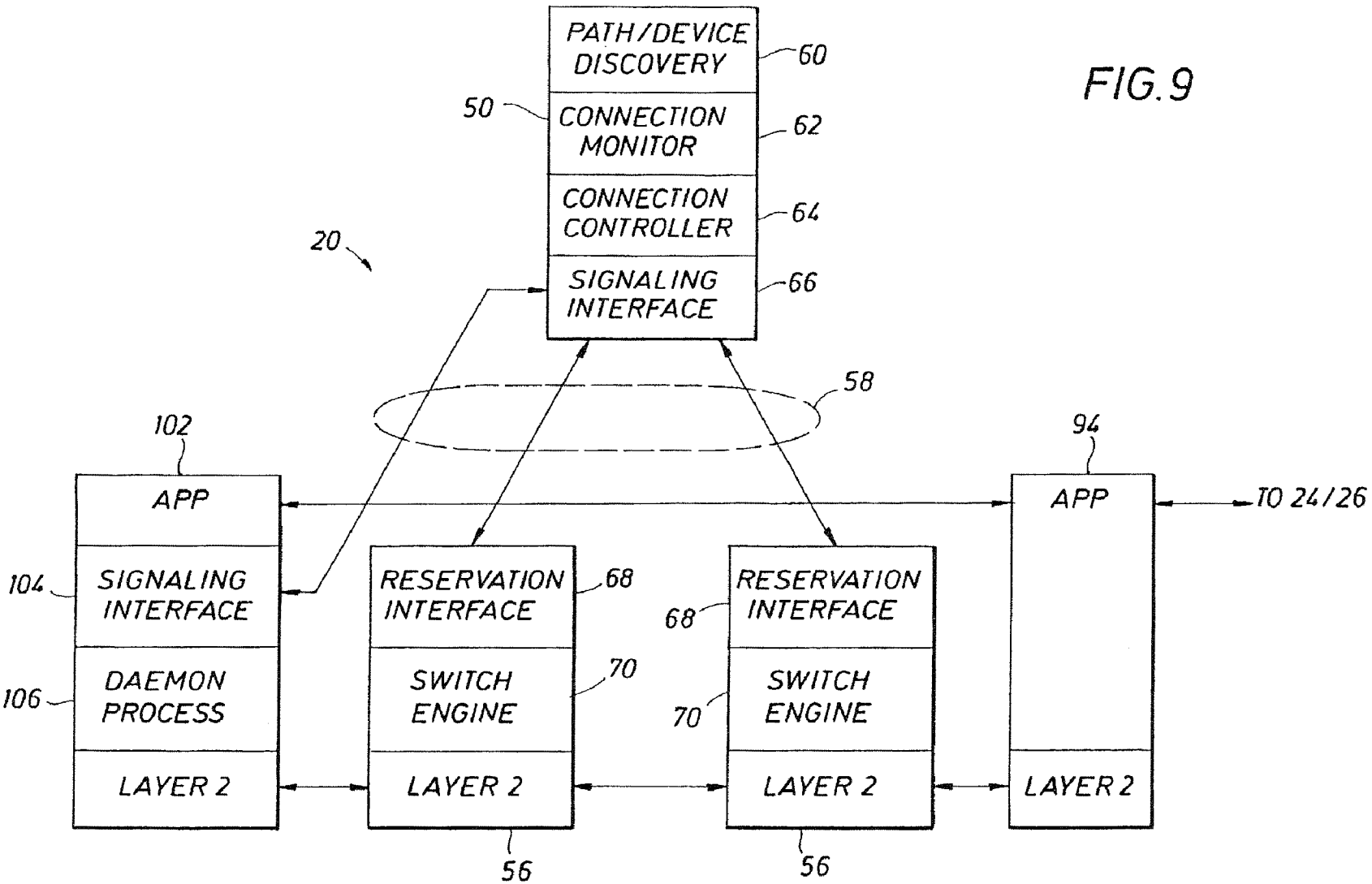
FIG. 9 illustrates another example of a network that provides guaranteed COS while providing interoperation with IEEE 802.1P/Q frame formats in accordance with the example of the invention in FIG. 3.

A further example of a local area network 20 in accordance with the present invention is illustrated in FIG. 9. In this embodiment, differently from the above-described embodiments, the network includes one or more hosts 102 that have been configured with enhanced functionality for directly requesting a reserved connection from ECP 50 similarly as described in the co-pending application Ser. No. 09/060,520.

That is, in this embodiment, host 102 includes a daemon process 106 that processes user requests.for reserved connections with other hosts within the network or in other networks. In accordance with requested connections processed by daemon process 106, signaling interface 104 sends connect/disconnect messages to ECP 50 via reserved signaling channel 58. Although FIG. 9 illustrates an example where host 102 is communicating with a conventional host/router 94, it should be apparent that host 102 can also communicate with other hosts similarly upgraded as host 102.

Figure 10:
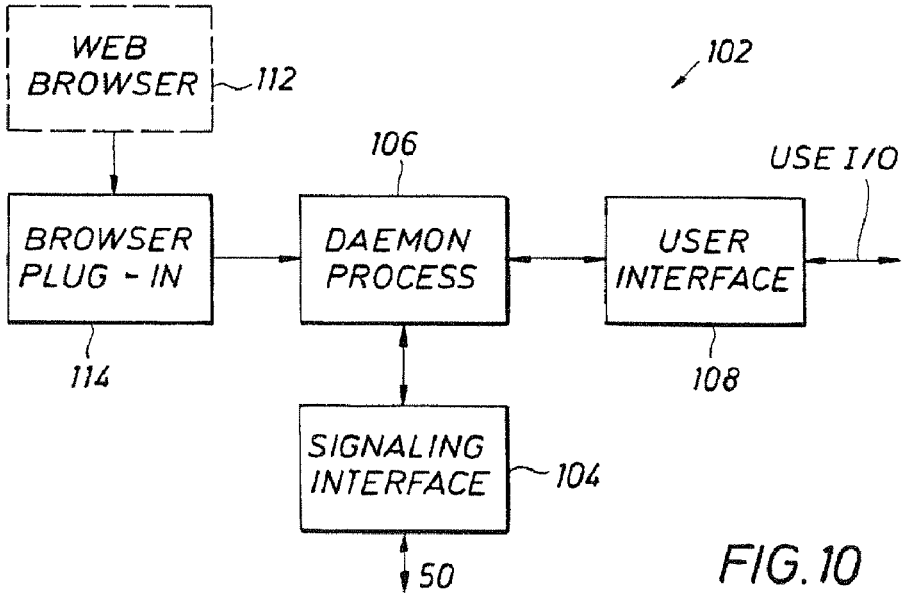
FIG. 10 is a block diagram further illustrating the functionality of a host adapted for use in a network such as that illustrated in FIG. 9.

FIG. 10 further illustrates one example of the functional capabilities of a host 102 adapted for establishing reserved connections according to the present invention. As shown, it includes a web browser 112, a browser plug-in application 110, a daemon process 106, a user interface process 108, and a signaling interface process 104. The above processes are operable within a common operating system such as Windows 95 or NT from Microsoft Corp. of Redmond, Wash., for example.

Although examples of the above components are fully described in detail in the co-pending application Ser. No. 09/060,520, they will be briefly described here as they are adapted for use in the present invention. Web browser 112 is preferably a Java-capable browser such as NetScape Communicator 4.0 from NetScape Communications Corp. of Mountain View, Calif., for example. Daemon process 106 provides the functionality needed to take advantage of the virtual circuit services according to the present invention, and is preferably instantiated on host 102 when it is powered on. User interface process 108 responds to user inputs from I/O devices attached to host 102 (e.g. keyboard and mouse), and draws objects on a video display associated with the host. To enable browser 112 to handle URLs unique to the reserved connection services of the present invention, browser 112 is configured with plug-in application 110, whose main function is to notify daemon process 106 when a reserved connection is being requested from the browser. Signaling interface process 104 receives requests for participation in, or termination of, a reserved connection from ECP 50 via signaling channel 58 and the host's NIC and forwards them to daemon process 106 upon receipt, and also sends requests for origination or termination of reserved connections to ECP. 50 upon command from daemon process 106.

When host 102 is powered on, daemon process 106 is instantiated and starts up signaling interface process 104. Daemon process 106 then waits for messages from either the browser 112 (via browser plug-in application 110), requesting that a reserved connection be initiated or terminated, or from signaling interface process 104, indicating that another host is requesting that host 102 participate in, or wishes to terminate a reserved connection.

For example, when a user is running browser 112 and desires to originate a reserved connection, a web page that contains a directory of users is accessed and the directory is displayed in the browser window. The directory contains a list of users, whose names are preferably shown as hypertext with links having URLs that are unique to the reserved connection services of the present invention. When the user selects a party or parties from the list, browser 112 invokes plug-in application 110 to handle the request, and plug-in application 110 in turn notifies daemon process 106. Daemon process 106 invokes user interface process 108, which draws a dialog box on the host's display asking the user to specify what kind of connection is desired (e.g., audio only, data only, teleconference, etc.). This information is returned to daemon process 106 and formatted into a connection request that is forwarded to signaling interface 104, which sends the request to ECP 50.

ECP 50 then processes the request similarly as described above by checking the resources along the path(s) to the requested destination and attempting to secure the desired service. If the connection can not be established (e.g., not enough bandwidth available, or the other participant does not agree to the connection), ECP 50 notifies host 102 to that effect via signaling channel 58, which message is received by signaling interface process 104. Signaling interface process 104 forwards the message to daemon process 106, which in turn commands user interface process 108 to paint a message on the host's display informing the user that the requested connection was refused. Alternatively, ECP 50 can determine the path with the next highest available service and advise host 102, which message would be forwarded to daemon process 106 via signaling interface process 104. Daemon process 106 could then command user interface process 108 to paint a message with the advisement and an action box for allowing the user to accept or decline the next highest available service.

If the connection can be established with the requested service, ECP 50 notifies host 102 to that effect via signaling channel 58, which message is received by signaling interface process 104. Signaling interface process 104 forwards the message to daemon process 106, which in turn commands user interface process 108 to paint a message on the host's display informing the user that the requested connection was granted. Additional functionality can also be built in to launch a software application desired for that connection (such as a video or audio conference).

The message from ECP 50 notifying host 102 that the connection can be established also includes the "user_priority" or selected queue that host 102 should use in the IEEE 802.1P/Q frame header of all packets corresponding to that connection.

At the time the connection is established, user interface process 108 can also paint an action box on the display that permits the user to terminate the connection when desired. When such an action is desired by the user, the answer is collected by user interface process 108 via user I/O devices and relayed to daemon process 106. Daemon process 106 then formats a disconnection request message which is sent to ECP 50 via signaling interface process 104 and signaling channel 58. Upon such a disconnection request from host 102, ECP 50 sends bandwidth release messages to all switches 56 involved in the connection.

Meanwhile, for connection requests sent to host 102 from another network host, these are received by daemon process 106 via signaling interface process 104. These can be signaled directly to ECP 50 by another host within the LAN with similar capabilities as host 102, or they can be requests from conventional endstations according to reservation protocols such as RSVP or IEEE 802.1P/Q that are intercepted along the way and forwarded to ECP 50, which then realizes it can signal directly to host 102 whether to accept the request. When such requests are received by host 102, daemon process 106 activates user interface process 108, which in turn paints a dialog box on the host's video display, querying the user whether to participate in the connection. The answer is collected by user interface process 108 via user I/O devices and relayed to the daemon process 106. Daemon process 106 then formats an answer message which is sent to ECP 50 via signaling interface process 104. Similar processing is performed for connection termination requests from other hosts.

Although the process of requesting a reserved connection has been described above with reference to the example of a user interface process interacting with a user to select a type of connection, it should be apparent that many alternatives are possible. For example, additional layers of software can be built into applications that automatically request a connection, determine the type of connection to be made, and how much bandwidth and what quality or class of service to request for such connection.

Furthermore, the process of responding to requests for connections can be entirely automatic, as could be the case in an endstation such as a server. That is, no user interaction need be required to respond to requests from network users to log onto or access information from the server. Accordingly, the software load on such endstations could be limited to a daemon process such as 106 and a signaling interface process such as 104.

It should be apparent that, similarly to the embodiment illustrated in FIG. 7, it is possible in the embodiment illustrated in FIG. 9 that conventional switches may also lie in the path between hosts participating in a reserved connection. Although the requested COS can not be fully guaranteed through such switches in such a configuration, the invention is still operable and coexists seamlessly with such conventional switches. Furthermore, if the conventional switch supports IEEE 802.1P/Q, since this example of the invention uses such formats, a COS approximate to the requested level is possible.

Figure 11:
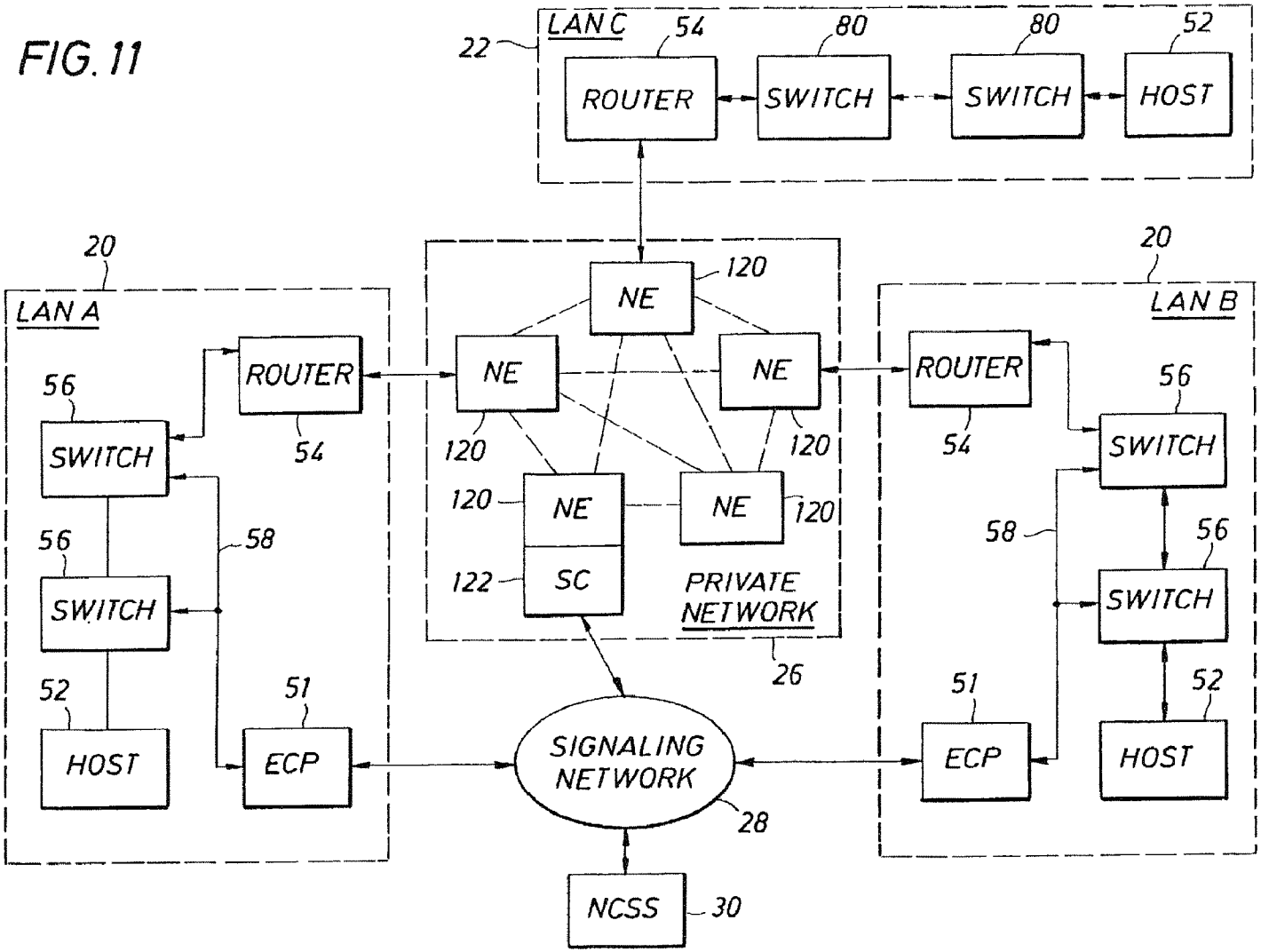
FIG. 11 is a top-level block diagram illustrating an example of the invention adapted for use with LANs interconnected via a private network/virtual private network and further including a network control system server for controlling internetwork connections.

Further advantages are achieved when the principles of the invention are extended to inter-network reserved connections in addition to reserved connections within a local network. For example, as illustrated in FIG. 11, LAN A, LAN B and LAN C are all connected together via a private network/virtual private network 26 such as leased lines, X.25, Frame Relay, ISDN, or ATM. In this embodiment, LANs A and B (20) each have enhanced functionality according to the present invention, while LAN C (22) does not. Switches 56 in LANs A and B trap RSVP Path and Resv messages destined outside their networks (as well as IEEE 802.1P/Q packets, and packets associated with other reservation protocols) and inform the respective ECP 51 via the respective signaling channel 58. ECP 51 processes the information and reserves resources for the connection within the local network as described above, and also notifies network control system server (NCSS) 30 via signaling network 28. Examples of NCSS 30 and signaling network 28 that can be adapted for use with the present invention are fully described in U.S. patent application Ser. No. 08/966,634, filed Nov. 10, 1997 and commonly owned by the assignee of the present invention, the contents of which are fully incorporated herein by reference. For reservation protocol messages from and to LAN C, these are not trapped until they are detected upstream or downstream in LAN A or LAN B.

As shown in FIG. 11, network 26 includes one or more controllable network elements (NEs) 120 that are connected together in a mesh. Some or (preferably) all of the controllable network elements further include a switch commander (SC) 122 (as described in co-pending application Ser. No. 08/966,634) that communicates with NCSS 30 via the signaling network 28. The controllable network elements 120 can be devices such as DACs, ATM switches, ADMs, SONET and SONET ATM, IP/ATM or IP/FR concentrators, IP switches and routers, QOS routers, Layer 2 switches, Optical switches, Frame Relay, Mux/Demuxes and SMDS. Accordingly, as will be explained in more detail below, when reservation messages are trapped and information concerning the flows to which they belong is forwarded to NCSS 30, NCSS 30 uses the information to "switch up" the connection within network 26 via the certain NEs (if any) that are in the path of the flow and that include a switch commander.

Figure 12:
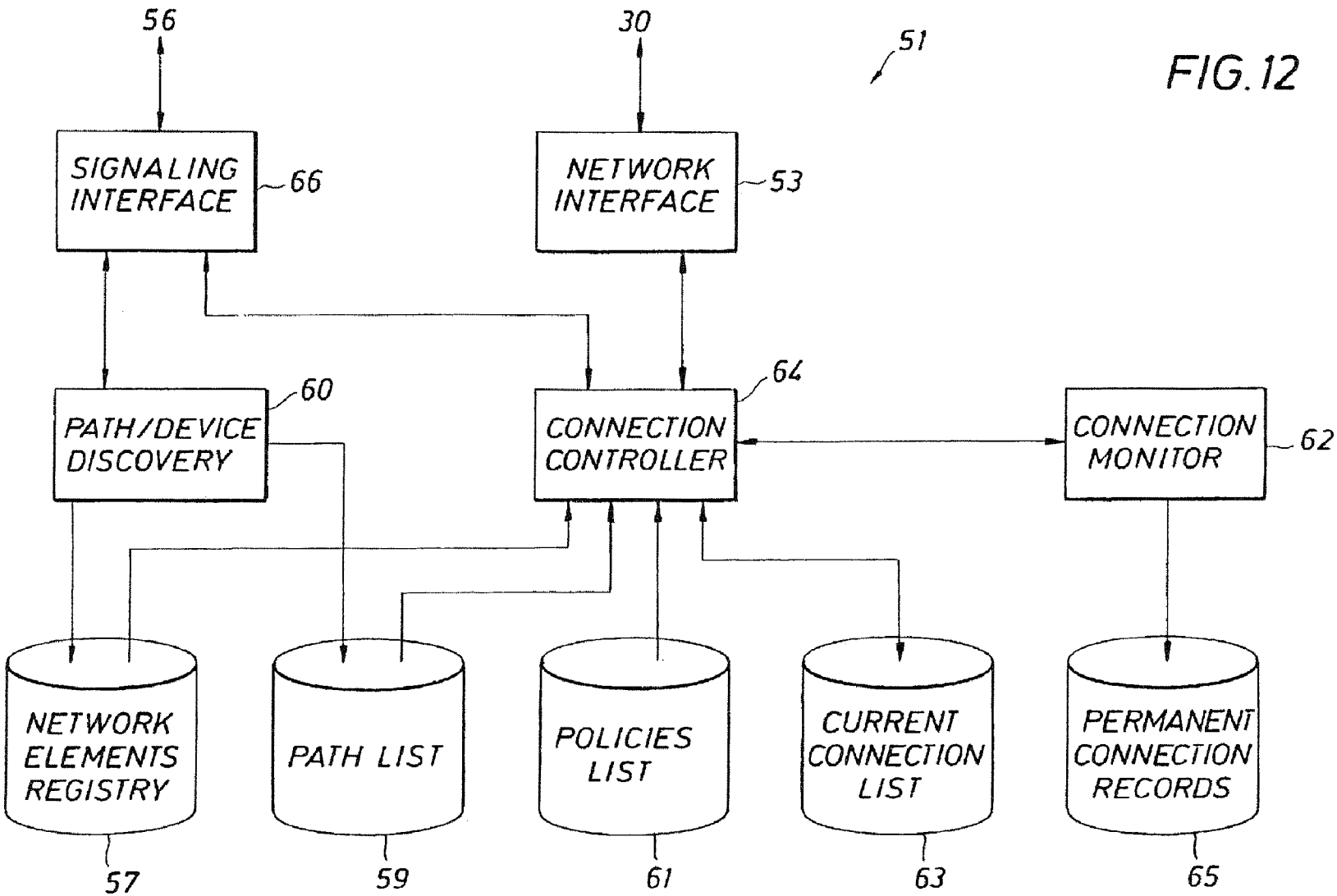
FIG. 12 is a block diagram further illustrating the functionality of an ECP adapted for use in a local area network including in the network illustrated in FIG. 11.

FIG. 12 further illustrates an ECP 51 for use in this embodiment of the invention. As shown, it further includes a network interface function 53 for communicating with NCSS 30 via signaling network 28. Such communications by network interface function 53 may be according to a particular signaling protocol, such as the ITU standard signaling protocol Q.931, or other actual and de-facto telephone and Internet signaling standards, as are known well to those versed in the art. Accordingly, when a request for a reserved connection is detected within LAN 20, ECP 51 will be notified and will secure the necessary resources within the network, if available, for the connection, as described above. Connection controller 64 makes a further determination whether the connection includes the participation of a host in another network. If so, ECP 51 signals a connection setup request to NCSS 30 via signaling network 28.

Figure 13:
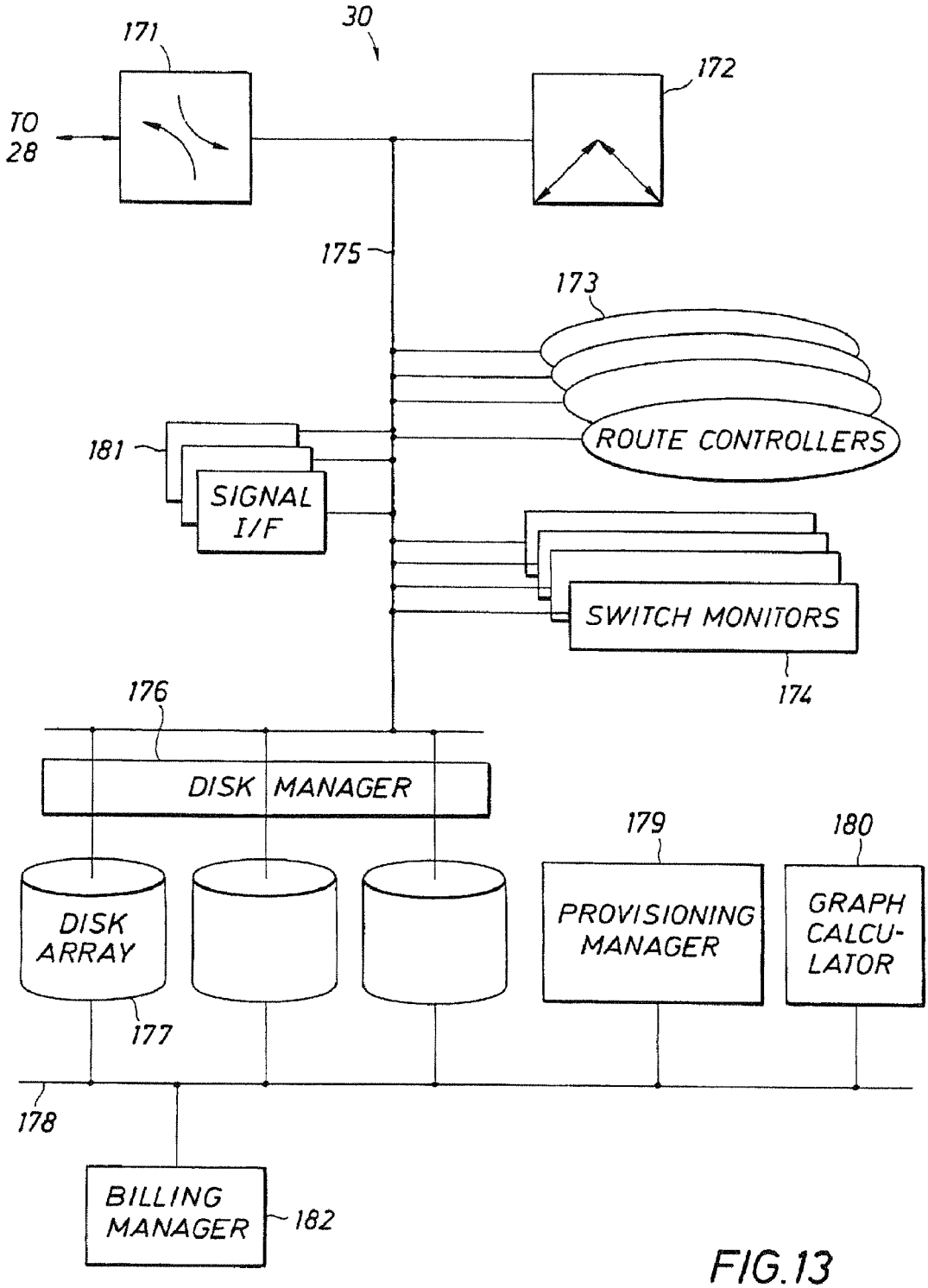
FIG. 13 is a block diagram further illustrating the functionality of a network control system server adapted for use in the network illustrated in FIG. 11.

FIG. 13 further illustrates an NCSS 30 according to the invention. As shown in FIG. 13, it includes a router 171, a director 172, route controllers 173, switch monitors 174, a database server 176, and signaling network interfaces 181, all connected on a high speed local network 175. The database server 176 provides access to disk array 177. Disk array 177 is also attached to low speed local network 178 for maintenance and billing. Also attached to low speed local network 178 are provisioning manager 179, graph calculator 180, and billing management component. 182. Signaling interfaces 181 provide communications to switch commanders 122 associated with network elements 120, which communications are maintained via signaling network 28 and router 171. Signaling interfaces 181 and route controllers 173 are shown as a plurality of elements to clarify the aspect that there may be more than one instantiation of each active at a time. The number of switch monitors 174 corresponds to the number of NEs 120 in network 26, and each switch monitor 174 is respectively responsible for a corresponding NE 120. However, each has the same functionality and preferably presents the same interface to other elements of the network control system server.

The above elements are described in detail in co-pending application Ser. No. 08/966,634. Briefly, however, as adapted for use in the present invention, graph calculator 180 precomputes, between every local area network 20, 22 connected to network 26, all possible paths through all NEs 120. The resulting list of paths is called a call graph and is stored in disk array 177.

Bandwidth resources available to the network are managed in terms of facilities (described in more detail in co-pending application Ser. No. 08/966,634). Facilities information is stored in disk array 177. Provisioning manager 179 manages this information and cooperates with the graph calculator for performing call graph and path calculation. This provides the other subsystems in NCSS 30 with pre-calculated routing paths and costing information. The availability of such pre-calculated and costed paths at connection time substantially speeds up the processing for creating on-demand reserved connections.

Route controllers 173 of NCSS 30 are instantiated once for each reserved connection to be established within network 26. They perform two major functions: connection setup and connection teardown. The process of setting up or tearing down a reserved connection within network 26 is accomplished with cooperation of the signaling interfaces 181 and switch monitors 174. Signaling interfaces 181 communicate with ECPs that have detected requests for beginning or ending a reserved connection. Switch monitors 174 communicate with switch commanders 122 associated with NEs 120 to send commands for "switching up" a connection along the selected path between the communicating LANs. Switch monitors 174 also monitor the resources instantaneously available within each NE 120 so as to provide information regarding whether the NE will be able to satisfy the service requested for the reserved connection.

The signaling interfaces, route controllers and switch monitors also use database server 176 available as part of NCSS 30 to store information in disk array 177 about reserved connections that are established, billing status, and network operations status. Database server 176 and disk array 177 can be implemented in many ways known to those skilled in the art.

Billing management component 182 has access to disk array 177 via low speed network 178. It collects and formats the information recorded therein for output and use according to de-facto standard billing information formats used throughout the telecommunications industry. The database records relating to network connection events described above are queued for reformatting by database server 176 upon their insertion during the connection teardown processing.

The operation of the above components for setting up and tearing down a reserved connection within network 26 between two or more LANs 20, 22 will now be described in more detail. Particularly, when a reserved connection between hosts in LANs 20, 22 is to be made using network 26, the respective ECP 51 that first detects the "reservation" request performs its usual processing for establishing the connection within its own network (described previously) and also sends a connection setup request to NCSS 30 over signaling network 28. Such setup requests are received by signaling interfaces 181. When a signaling interface 181 receives a request for a reserved connection, a route controller 173 is activated to set up the connection. The particular choice of route controller 173 is made on a load-balancing basis by director 172. Associated with the request from ECP 51 is the source and destination addresses of the requested reserved connection (typically IP addresses), and the service requested for the connection.

Route controller 173 receives the setup message via signaling network interface 181 and looks up the addresses in disk array 177 via database server 176 and high-speed LAN 175. When the source and destination hosts are identified, including the respective LANs 20, 22 in which they exist, the corresponding call graph listing all paths through network 26 between the LANs is fetched from disk array 177 and returned to route controller 173. The route controller then determines a multicast group for broadcasting messages to switch monitors 174 corresponding to all underlying NEs in the call graph, and assigns a multicast address to the group. This multicast group will last until the connection is either connected or released. The route controller 173 alerts each switch monitor 174 and waits for them to all join the group.

After all switch monitors 174 have joined the multicast group, for each switch monitor in the multicast group, the route controller constructs and sends a "Reserve" message stating the list of next-neighbors in the graph, an identifier for the requested reserved connection, and the service requested (e.g. total bandwidth). Alternatively, this message can be sent at the same time as the switch monitors are alerted and before all switch monitors have joined the group.

In response to the "Reserve" message, each switch monitor 174 determines if the requested service is available on each next-neighbor link. If not already done, each switch monitor also simultaneously joins the multicast group for the connection. Each switch monitor 174 then multicasts its answer (which may be a partial allocation; i.e., if service corresponding to 96 bearer channels was requested on outputs from switch A to switch B, and only 72 channels were available, the monitor for NE A would respond with an answer such as "A to next-neighbor B: 72 of 95: circuit-range circuit-range. . . ") back to route controller 173.

Route controller 173, having received the multicast results, identifies and culls out links that can not support the requested service and selects the first path (preferably with the fewest hops) that can support the requested service as the actual path to be used. The route controller also sends a "Reserved" message to all switch monitors in the multicast group, containing the complete connection path. Upon receiving this "Reserved" multicast, each switch monitor 174 then determines what resources are needed on the actual connection path for its corresponding NE 120 and releases any reserved resources not needed on the path. In addition, the path selected is written to the disk array 177. Each switch monitor with reserved resources then transmits the correct connect commands to their respective NE so as to physically switch up the connection; as each of these messages is queued, the switch monitor sends a "Connect Sent" message to the multicast group. When all NEs have been sent their connect messages, the route controller sends "Connected" to each of the participating switch monitors. The route controller continues to listen for messages from the multicast group until each switch monitor responds with "Connected." When that happens, the route controller commits the transaction, frees the multicast group, and releases any processor resources it's been using.

Teardown transactions can be initiated much like setup transactions. The ECP 51 that first detects when a reserved connection is ending (e.g. by monitoring a timeout interval between packets belonging to the connection or by detecting a PathTear or ResvTear message) sends a disconnection request to a signaling interface 181 via router 171. This signaling interface then allocates a route controller 173 and informs the route controller of the teardown request. Teardown proceeds in similar fashion to setup. The route controller 173 queries the database server to request information from database 177 to determine the current state of the entire connection. From this information, and from the information saved from the original setup message, the route controller determines which two-party reservations need to be released (that is, for example, for a conference between users A, B, and C, if A wishes to be released, the two-party reservation between A and B and the two-party reservation between A and C would need to be released, while the B to C connection is maintained). It also finds the multicast address that was assigned during setup of those reservations; these multicast identifiers are re-used for the teardown phase. Alternatively, different multicast identifiers could be used.

Route controller 173 then sends unicast messages to each of the switch monitors 174 having underlying NEs 120 that are involved in each of the identified two-party reservations. Alternatively, route controller 173 broadcasts or multicasts this request. Each involved switch monitor 174 then joins the multicast group associated with the two-party teardown transaction. When all involved switch monitors have joined, the route controller issues the information necessary to tear down the reservation.

Each switch monitor 174 then communicates, via signaling network 28 and router 171, with the switch commander 122 or other switch or router interface associated with the underlying NEs, to release the reserved connection. When the underlying NE acknowledges the release, the switch monitor multicasts the acknowledgement of released resources. When all switch monitors have acknowledged release, the route controller 173 issues a "release commit" message on the multicast group. Each switch monitor then releases its internal representation of the reservation and leaves the multicast group. Simultaneously, the route controller writes reservation release records to the database server 176 for storage in disk array 177.

The route controller then informs the signaling interface 181 of the completion of the transaction. The signaling interface then releases the route controller 173 for use by other signaling transactions.

Figure 14:
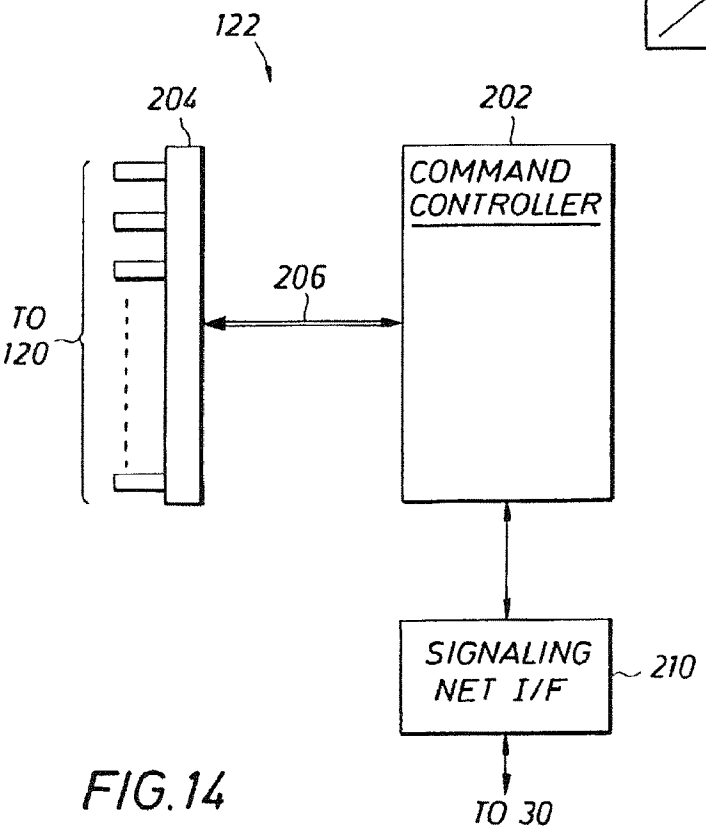
FIG. 14 is a block diagram further illustrating the functionality of a switch commander adapted for use in the network illustrated in FIG. 11.

FIG. 14 further illustrates a switch commander 122 according to the present invention. The switch commander serves as the interface between NCSS 30 and controllable network elements such as NE 120. Primarily, switch commander 122 works to queue and translate commands sent by switch monitors 174 in NCSS 30 via signaling network 28 (preferably TL1 X.25 commands, but often commands that are proprietary to a particular network element) and the particular command language of the underlying network element.

Various examples of switch commander 122 are described in detail in co-pending application Ser. No. 08/966,634. Briefly, however, as adapted for use in the present invention, switch commander 122 includes a command controller 202 that translates commands from NCSS 30 into the native language of the NEs and communicates the commands to a plurality of NEs 120 attached to ports 204 via port lines 206. In this illustrated example, switch commander 122 also includes a signaling network interface 210 that queues commands from NCSS 30 and sends responses from command controller 202 via the signaling network 28.

As noted in the co-pending application, the above components can be implemented in many known ways. However, it is preferable that command controller 202 is a SPARCstation running Solaris 5.5.1 (trademarks of Sun Microsystems, Inc.) and that ports 204 are X.25 ports. Preferably, switch commanders are implemented on both Sparc and x86 platforms, and use TCP/IP in general, and Telnet specifically, to communicate with NEs 120. It should be noted, however, that switch commanders 122 may actually be physically located at the site of NCSS 30. In such a case, X.25 is carried over leased lines (i.e. port lines 206 are leased lines) to the appropriate NEs to be controlled, while the switch commander itself is accessed via the network control system server's own Ethernet.

In operation, therefore, when a corresponding switch monitor 174 sends a "Connect" command to one of NEs 120 attached to ports 204, this message will be received by signaling network interface 210 and relayed to command controller 206. The command specifies the specific NE to be controlled, the amount of resources to be reserved, and the crosspoints of the NE between which the connection is to be made. Command controller 206 will translate the command into the native language of the NE and transmit the native connection command to the corresponding one of ports 204 via lines 206. The native connection command will typically cause the NE to reserve a specified bandwidth between the two identified crosspoints of the controllable network element that will not be released until a subsequent "Release" command is issued.

Figure 15:
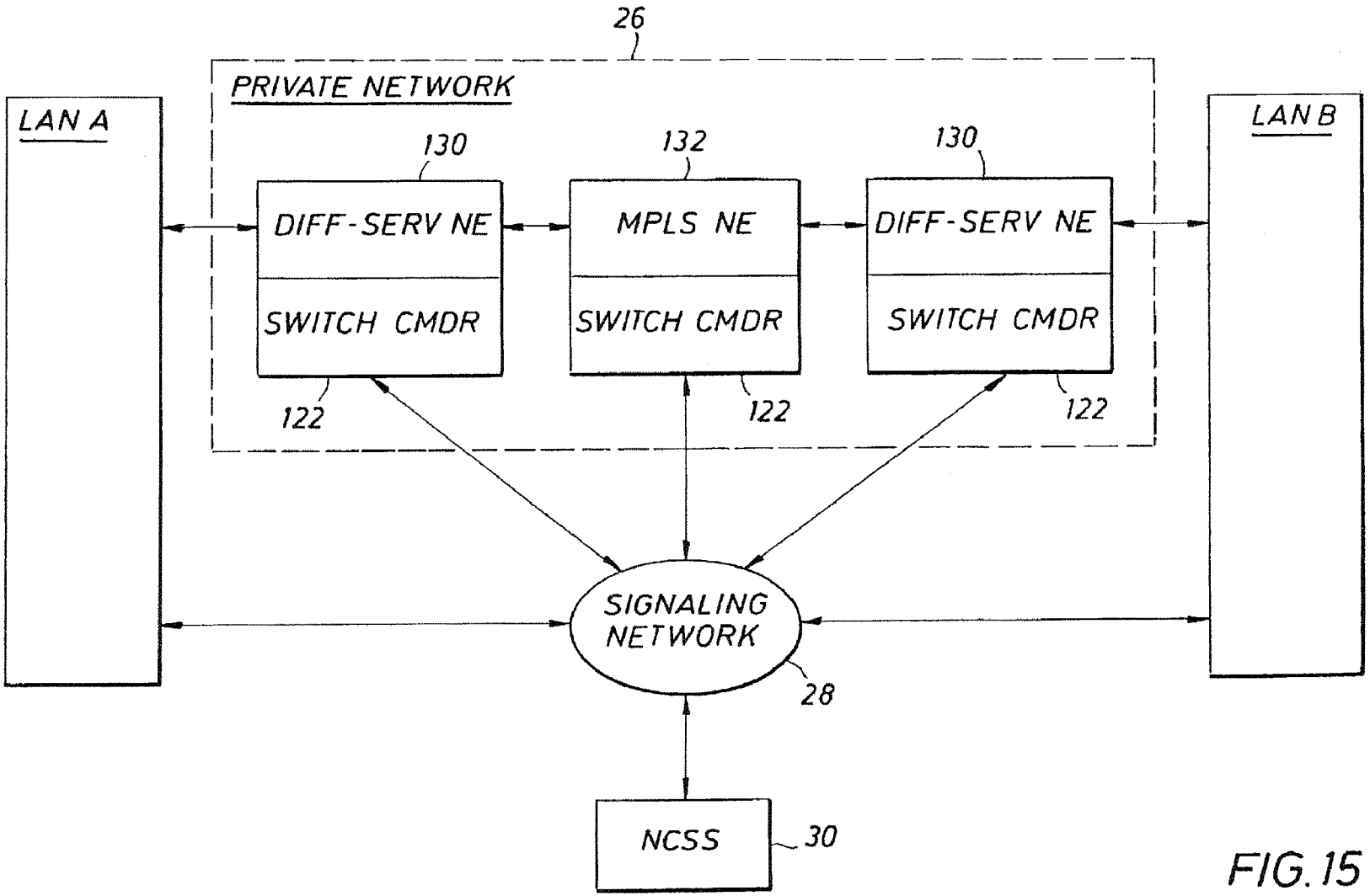
FIG. 15 is a block diagram illustrating another example of internetwork connections in a network such as that illustrated in FIG. 11.

A further aspect of the invention is illustrated in FIG. 15. As shown in FIG. 15, included within the private network/virtual private network 26 are a chain of incompatible NEs. That is, as shown, messages between LAN A and LAN B must pass through a chain of NEs comprising a first NE 130 supporting diff-serv tagging, followed by a NE 132 supporting MPLS, followed by another NE 130 supporting diff-serv tagging. Because MPLS and diff-serv use different tagging schemes, reserved connections attempted between LANs A and B would not succeed unless such NEs are capable of sending and receiving packets having both types of tagging.

In this embodiment of the invention, however, NEs 130 and 132 have been adapted with switch commanders 122 to communicate with NCSS 30 via signaling network 28, and are able to translate between formats as directed by NCSS 30. Accordingly, when reservation protocol messages are trapped in LANs A and B, and NCSS 30 is notified, because NCSS 30 knows that different tagging is used in NEs 130 and 132, it will alert the NEs accordingly when switching up the connection, and cause the NEs to make the appropriate translation while forwarding the packets belonging to that connection.

Figure 16:
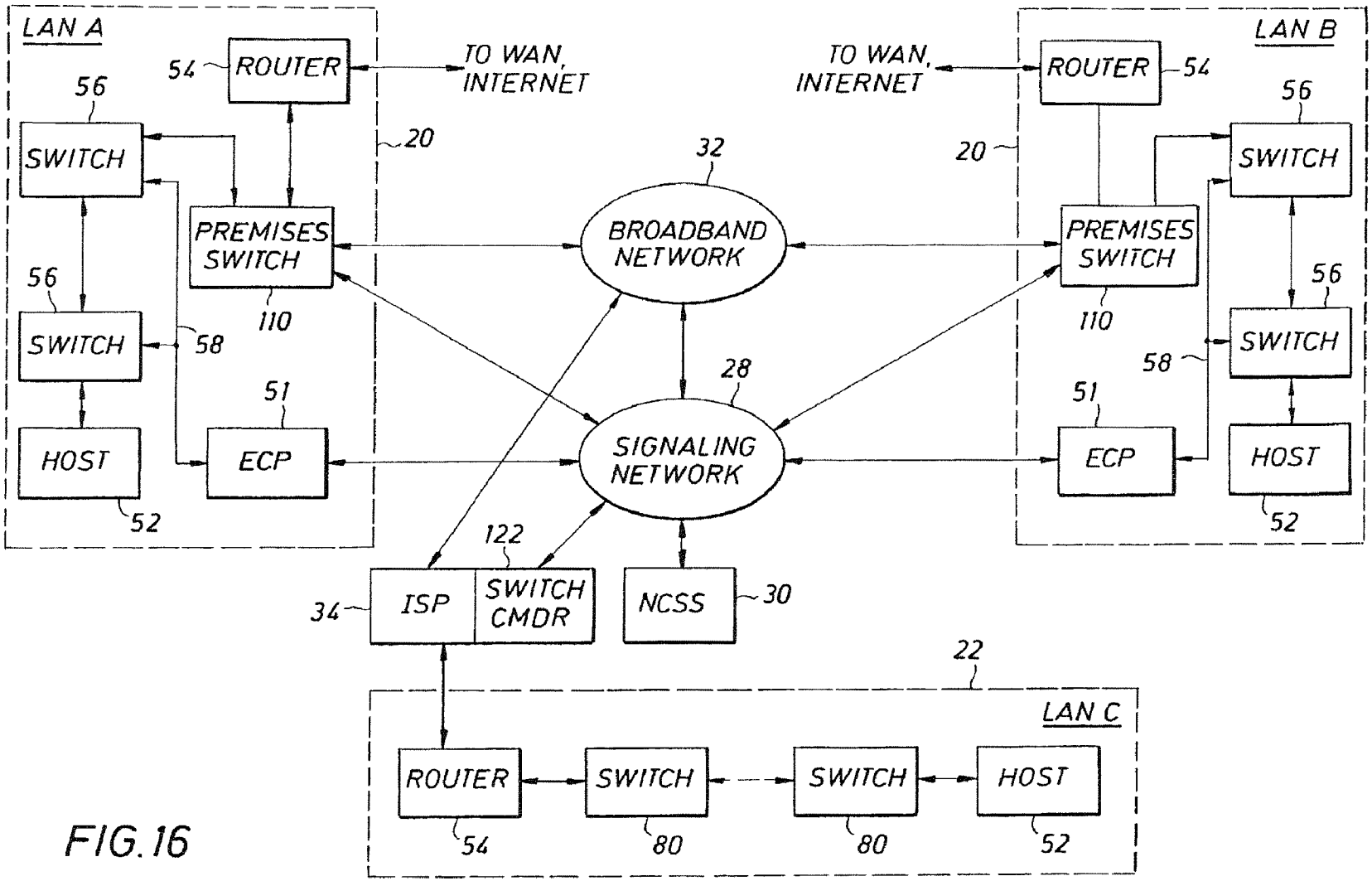
FIG. 16 is a top-level block diagram illustrating an example of the invention adapted for use with LANs interconnected via a broadband network such as that described in co-pending application Ser. No. 08/966,634 and further including a network control system server for controlling internetwork connections.

FIG. 16. illustrates an embodiment where LANs A and B (20) are connected via a broadband network 32 such as that described in co-pending application Ser. No. 08/966,634. In this embodiment, LANs A and B (20) each have an ECP 51 that communicates with NCSS 30 via signaling network 28. Switches 56 in LANs A and B trap RSVP Path and Resv messages destined outside their networks (as well as IEEE 802.1P/Q packets, and other reservation protocols) and forward copies to the respective ECP 51 via the respective signaling channel 58. ECP 51 processes the information as described above, and also sends a copy to NCSS 30 via signaling network 28. Examples of NCSS 30 and signaling network 28 that can be adapted for use in this embodiment of the invention are fully described in co-pending application Ser. No. 08/966,634.

As further shown in FIG. 16, LANs A and B also each include a premises switch 110 (described in co-pending application Ser. No. 08/966,634) that communicates with NCSS 30 via signaling network 28 and also provides an interface to the infrastructure of the broadband network 32. Accordingly, when reservation messages are trapped and information concerning the flows to which they belong is forwarded to NCSS 30, NCSS 30 can determine whether the messages are destined for another network configured to interface with the broadband network, and if so, whether a path between the hosts involved in the session that can satisfy the requested service exists within the network. If the requested connection can be fulfilled by the broadband network, NCSS 30 uses the information in the messages to "switch up" the connection via a selected path through the broadband network, and causes the traffic corresponding to that flow to be forwarded through premises switch 110 in each LAN 20, rather than through router 54. If the messages are not destined for another network having a premises switch 110, they are forwarded through router 54 as are other inter-network messages.

Also shown in FIG. 16 is a LAN C (22) not having an ECP 51 according to the invention. However, in this example, LAN C communicates with an Internet service provider (ISP) 34 that is equipped to communicate with broadband network 32 and signaling network 28 via a switch commander 122. Accordingly, NCSS 30 can determine whether requests for reserved connections from LANs A and B involve LAN C and allow them to be routed through the broadband network 32 rather than through the public Internet. In this example, ISP 34 typically includes a QOS router coupled between broadband network 32 and LAN C (22).

Figure 17:
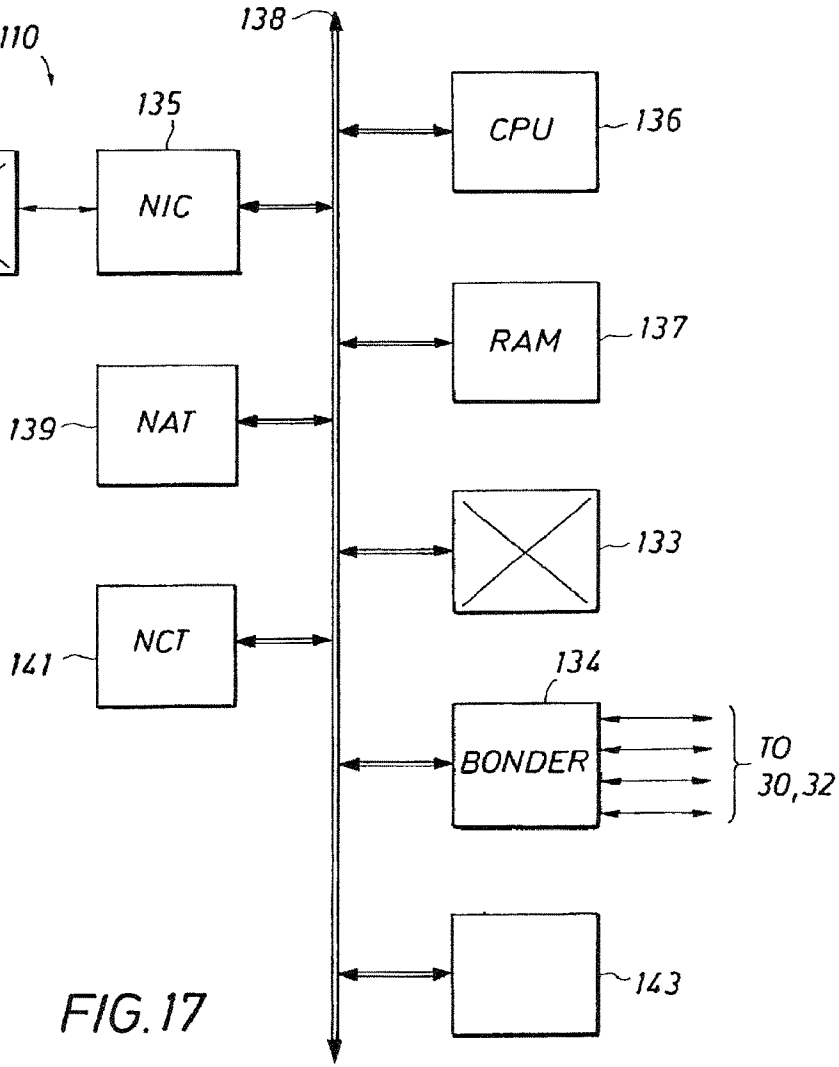
FIG. 17 is a block diagram further illustrating the functionality of a premises switch adapted for use in a local area network in the network illustrated in FIG. 16.

FIG. 17 further illustrates a premises switch 110 adapted for use in the invention shown in FIG. 16. As shown, premises switch 110 includes a routing function 133, bonder 134, network interface card 135, CPU 136, RAM 137, network address translation (NAT) function 139, network command translation (NCT) function 141, and bonding function 143 that all communicate via bus 138. Packet switch 142 communicates with network interface card 135 via an Ethernet link.

Various examples of the above components of premises switch 110 are fully described in co-pending application Ser. No. 08/966,634. Briefly, however, as adapted for use in the present invention, packet switch 142 receives LAN packet traffic from intermediate switch 56. By reading their destination Ethernet addresses, packet switch 142 passes packets not associated with broadband network connections (i.e. packets that are not addressed to premises switch 110) through to the existing LAN router 54, while packets associated with broadband network connections are routed via routing function 133 to bonder 134 (i.e. packets that are addressed to premises switch 110) for transmission via broadband network 32. Likewise, LAN traffic from existing LAN router 54 is dispatched via packet switch 142 to LAN endstations such as host 52 via switches 56.

CPU 136 controls the operations of routing function 133, bonder 134, network interface card 135 and RAM 137. It coordinates the conversion of circuit-switched traffic data on broadband network connections, possibly spread between many bearer channels, into LAN type packet-switched data packets for further transmission within LAN 20, and vice-versa.

Network interface card 135 is a standard PCI Ethernet card for transmitting and receiving LAN data packets to/from LAN endstations such as host 52 via packet switch 142.

Routing function 133 is shown separately for clarity, but may be implemented as software running on CPU 136 or other processor. It is responsible for screening data packets received via packet switch 142 and directing them to the appropriate output port of bonder 134. It can also perform security functions that provide additional safeguards against unauthorized use of the broadband network by, for example, further screening the destination and source addresses of the packets and comparing them to a list of authorized users.

Bonder 134 receives broadband network connection data from LAN workstations such as host 52 via packet switch 142 and transmits the data to broadband network 32. Conversely, broadband network traffic data received from broadband network 32 is relayed by bonder 134 to LAN endstations such as host 52 via packet switch 142.

Network address translation function 139 is shown separately for clarity, but may be implemented as software running on CPU 136 or other processor. It is responsible for performing address translation of data packets received from LAN endstations such as host 52 via packet switch 142 for forwarding on the broadband network to endstations in other networks outside the LAN's address space and for performing address translation of data packets received over the broadband network from other networks outside the LAN's address space via bonder 134 and destined for LAN endstations.

Network command translation function 141 is shown separately for clarity, but may be implemented as software running on CPU 136 or other processor. It is responsible for translating and handling network connection commands received from switch monitors 174 over the signaling network 28 via bonder 134 in a similar manner as described in connection with switch commander 122.

Bonding function 143 is shown separately for clarity, but may be implemented as software running on CPU 136 or other processor. It maintains a list of ports (not shown) that are used for different broadband network connections, including signaling network traffic, circuit-switched traffic, and Internet access. A port can consist of one or more bearer channels. For example, a 6 Mbps circuit-switched connection can consist of 96 bearer channels, not necessarily multiplexed on the same Ti lines. The port for this connection is configured as a list of these channels, over which bonder 134 relays broadband data destined for and arriving from the broadband network. This list can be updated in accordance with channel reassignments ordered by NCSS 30.

As noted in the co-pending application, the installation of premises switch 110 in the existing local area network 20 is totally transparent to the LAN router 54 and other workstations operating on the LAN 20. Moreover, the process of installing premises switch 110 merely requires splicing into LAN connections to LAN router 54.

In operation, when a request for a reserved connection is detected within LAN 20, ECP 51 will be notified and will secure the necessary resources within the network, if available, for the connection, as described above. Connection controller 64 makes a further determination whether the connection includes the participation of a host in another network. If so, ECP 51 signals a connection setup request to NCSS 30 via signaling network 28.

When NCSS 30 determines that broadband network 32 can be used for the requested reserved connection, NCSS 30 sends a message to premises switch 110 via signaling network 30 to switch up the connection. This message includes the channel assignments to be maintained by bonding function 143 for the connection, as well as an identifier for the connection corresponding to the source and destination addresses of the session (typically IP addresses). CPU 138 will then send an ICMP re-direct that will cause the host 52 to send all packets associated with the reserved.connection to premises switch 110 instead of router 54. That is, more particularly, the ICMP re-direct tells host 52 that the address associated with the other participant in the reserved connection is reachable by sending packets to the MAC address of premises switch 110 instead of the MAC address of router 54. Accordingly, data belonging to the reserved connection will be forwarded to and from host 52 via packet switch 142 and to and from the host in the other network via broadband network 32 and bonder module 134. When the reserved connection is torn down, CPU 138 will cause another ICMP re-direct to be sent to host 52 instructing host 52 to send all packets destined to addresses associated with the other host's network back to router 54 and not premises switch 110.

In another possible implementation, instead of performing ICMP re-directs, each endstation includes point-to-point router functionality which is told through signaling to route traffic through the premises switch 110 rather than the existing default router 54.

An important distinction between this embodiment and the previous embodiments of the invention is that ECP 51 will wait for NCSS 30 to determine whether the reserved connection will use the broadband network before causing switch 56 to forward the intercepted Path message. In particular, if NCSS 30 determines that the broadband network will be used, it will send a message indicating such to ECP 51 via signaling network 28. ECP 51 will then instruct switch 56 to recapsulate the temporarily buffered Path message as a normal message so that it will propagate harmlessly through the network. On the other hand, if the broadband network will not be used for the reserved connection, ECP 51 will cause the temporarily buffered message to be forwarded along as a Path message through the Internet or private network.

It should be noted that premises switch 110 may be further or alternatively coupled to private network/virtual private network 26 for establishing reserved connections using resources of such a network 26 rather than, or in addition to broadband network 32. In such a configuration, the SCP/ECP can grow or shrink connections on demand and therefore provide pipe management for the private networks as well as connections to the public network from the same device.

Referring back to FIG. 16, for broadband network connections involving ISP 34, requests for such connections will be detected within LANs 20 having an ECP 51. NCSS 30 will realize that the endpoint for the broadband connection is actually ISP 34, rather than the LAN C, and will know that LAN C does not include a premises switch 110. Accordingly, the quality of connection between the host 52 within LAN C and the ISP 34 will depend on the bandwidth available between them. In some implementations, ISP 34 can further include a premises switch 110 for providing enhanced connection services to hosts 52 in LAN C.

Figure 18:
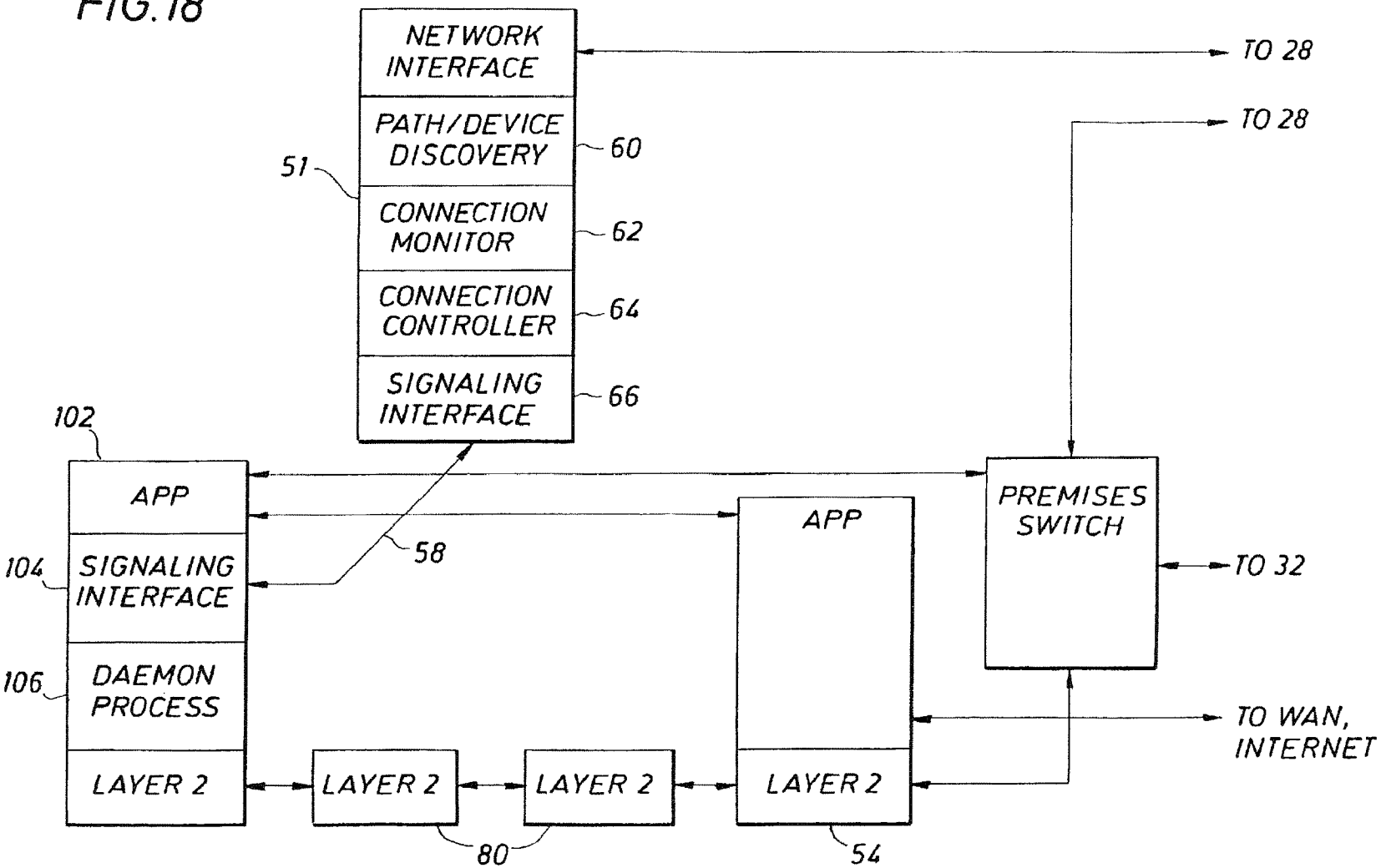
FIG. 18 illustrates another example of a local area network adapted for use with the broadband network in accordance with the invention illustrated in FIG. 16.
Figure 3:
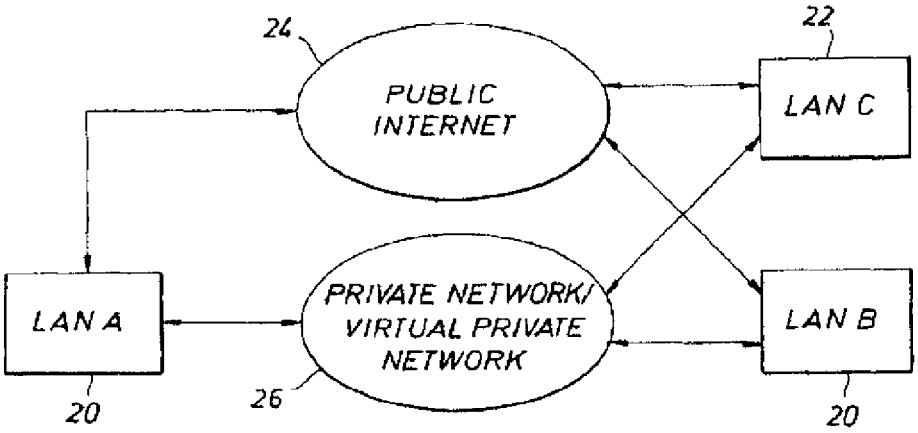
Figure 4:
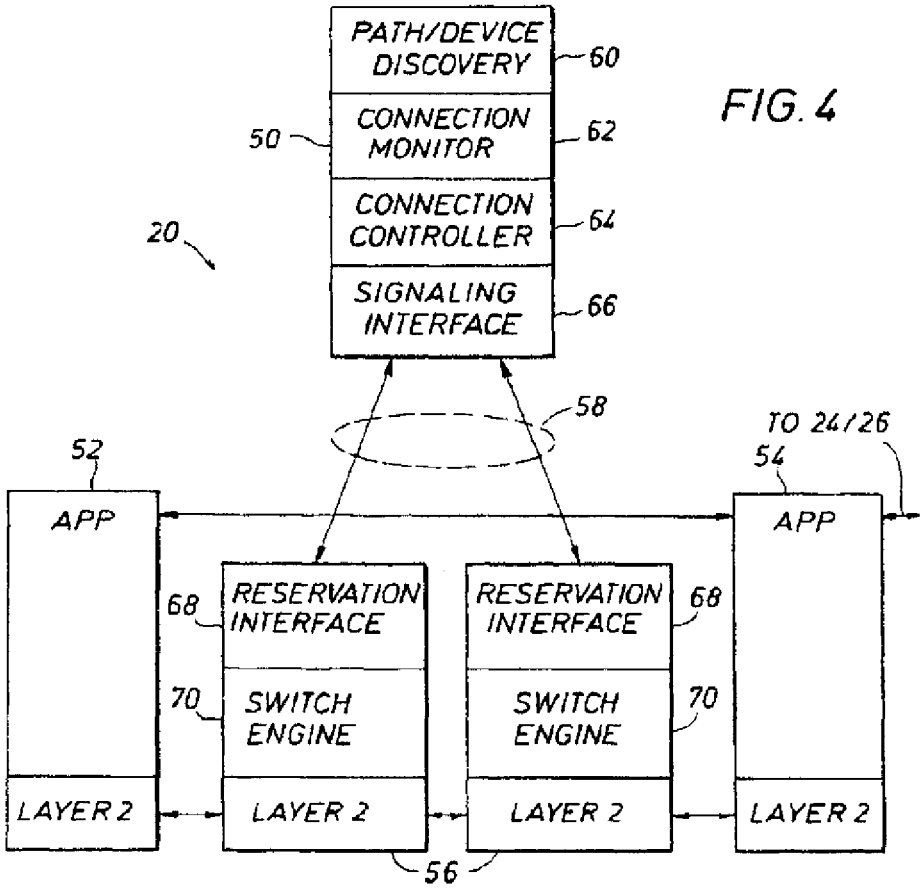

FIG. 18 illustrates an alternative embodiment of a LAN 20 for use in the example of the invention illustrated in FIG. 16. In this alternative implementation, intermediate switches 80 do not include enhanced functionality as previously described, but can be conventional switches, preferably that support IEEE 802.1P/Q. Requests for reserved connections using broadband network 32 and LAN 20 are made or accepted by enhanced host 102, having the enhanced functionality described above in connection with FIG. 9. When such reserved connections are requested, NCSS 30 will use SNMP messages relayed through premises switch 110 to cause resources to be reserved within intermediate switches 80 corresponding to the connection. Alternatively, NCSS 30 will cause ECP 51 to inform host 102 of the IEEE 802.1P/Q protocols to use for the connection.

Although the present invention has been described in detail with reference to the preferred embodiments thereof, those skilled in the art will appreciate that various substitutions and modifications can be made to the examples described herein while remaining within the spirit and scope of the invention as defined in the appended claims.

What is claimed is:

1. An apparatus for providing reserved connections between endstations, in a single network capable of providing best-effort and prioritized communications, comprising:

a switch in packet communication with the endstations that is adapted to detect and forward best-effort packets and packets that include requests for reserved connections according to a predetermined reservation protocol; and an enterprise control point adapted to communicate with the switch via a signaling channel, wherein the enterprise control point receives requested information concerning reserved connections from the switch and is adapted to identify at least one path in the network and to reserve resources along the path that can satisfy the reserved connections between the endstations in response to the received information.

2. An apparatus according to claim 1, wherein the network comprises one of a local area network and a wide area network.

3. An apparatus according to claim 1, wherein the predetermined reservation protocol is Reservation Protocol (RSVP).

4. An apparatus according to claim 3, wherein the switch is adapted to detect RSVP packets having path messages, to buffer the path messages, and to transmit copies of the path messages to the enterprise control point.

5. An apparatus according to claim 1, wherein the predetermined reservation protocol is an IEEE802.1P/Q protocol.

6. An apparatus according to claim 1, wherein the enterprise control point further comprises: a signaling interface adapted to communicate with the switch via the signaling channel;

a path/device discovery unit adapted to build and update a list of network elements and paths between the endstations; and a connection controller coupled to the signaling interface and the path/device discovery, wherein the connection controller is adapted to initiate and terminate reserved connections between the endstations in response to the received information.

7. An apparatus according to claim 1, wherein the switch further comprises:

a reservation interface adapted to forward the information concerning reserved connections to the enterprise control point and to receive resource reservation information from the enterprise control point via the signaling channel; and an enhanced switch engine coupled to the reservation interface, wherein the enhanced switch engine is adapted to extract the information concerning reserved connections from the detected packets and to perform packet forwarding decisions based on the received resource reservation information.

8. An apparatus according to claim 1, wherein the endstations are capable of communicating via the predetermined reservation protocol.

9. An apparatus according to claim 1, wherein the endstations comprise hosts and/or routers.

10. An apparatus according to claim 9, wherein the hosts and/or routers are capable of communicating via the predetermined reservation protocol.

11. A method for providing reserved connections between endstations in a single network capable of providing best-effort and prioritized communications, the method comprising:

detecting best-effort packets and packets that include requests for reserved connections according to a predetermined reservation protocol;

forwarding best-effort packets;

forwarding detected request information to an enterprise control point;

identifying a path within at least a portion of the network between the endstations that can establish the requested reserved connections; and reserving resources along the path so as to establish the requested reserved connections.

12. A method according to claim 11, wherein the network comprises one of a local area network and a wide area network.

13. A method according to claim 11, wherein the predetermined reservation protocol is Reservation Protocol (RSVP).

14. A method according to claim 11, wherein the predetermined reservation protocol is an IEEE802.1P/Q protocol.

15. A method according to claim 11, wherein the endstations are adapted to communicate via the predetermined reservation protocol.

16. A method according to claim 11, wherein the detecting step includes detecting packets having path messages, buffering the path messages, and wherein the forwarding step includes transmitting copies of the path messages to the enterprise control point.

17. A method according to claim 11, wherein the endstations comprise hosts and/or routers.

18. A method according to claim 17, wherein the hosts and/or routers are adapted to communicate via the predetermined reservation protocol.

19. A method according to claim 11, further comprising: maintaining a list of connections within the network; building and updating lists of network elements and paths between the endstations; and initiating and terminating the reserved connections within the network based on the list of connections and the lists of network elements and paths between the endstations.

20. A method according to claim 11, further comprising:

extracting request information from the detected packets;

receiving resource reservation information from the enterprise control point; and performing packet forwarding decisions based on the received resource reservation information.

21. An apparatus for reserving connections between endstations in a single network, capable of providing best-effort and prioritized communications comprising:

means for detecting best-effort packets and packets that include requests for reserved connections according to a predetermined reservation protocol;

means for forwarding best-effort packets;

means for forwarding detected request information to an enterprise control point;

means for identifying a path within at least a portion of the network between the endstations that can establish the requested reserved connections;

and means for reserving resources along the path so as to establish the requested reserved connections.

22. An apparatus according to claim 21, wherein the endstations are within the same local area network.

23. An apparatus according to claim 21, wherein the endstations are within the same wide area network.

24. An apparatus according to claim 21, wherein the enterprise control point further comprises:

means for communicating with a switch via a signaling channel;

means for maintaining a list of connections within the network;

means for building and updating lists of network elements and paths between the endstations; and means for initiating and terminating the reserved connections within the network based on the list of connections and the lists of network elements and paths between the endstations.

25. An apparatus according to claim 24, wherein the switch further comprises:

means for extracting request information from the detected packets;

means for forwarding the detected request information to the enterprise control point and for receiving resource reservation information from the enterprise control point via the signaling channel; and means for performing packet forwarding decisions based on the received resource reservation information.

26. An apparatus according to claim 24, wherein the switch further comprises:

means for detecting RSVP packets having path messages;

means for buffering the path messages; and means for transmitting copies of the path messages to the enterprise control point.

27. An apparatus according to claim 21, wherein the endstations are adapted to communicate via the predetermined reservation protocol.

28. An apparatus according to claim 21, wherein the endstations comprise hosts and/or routers.

29. An apparatus according to claim 28, wherein the hosts and/or routers are adapted to request and reserve a specified bandwidth and/or latency using the predetermined reservation protocol.

30. An enterprise control point adapted to reserve connections between endstations in a network, wherein the enterprise control point is adapted to communicate with a switch via a first signaling channel, to receive request information concerning reserved connections from the switch, and to identify at least one path in the network and to reserve resources along the path that can establish the reserved connections between the endstations in response to the received request information, the enterprise control point comprising:

a signaling interface adapted to communicate with the switch via the first signaling channel;

a path/device discovery unit adapted to build and update a list of network elements and paths between the endstations; and a connection controller coupled to the signaling interface and the path/device discovery unit, wherein the connection controller is adapted to initiate and terminate reserved connections between the endstations in response to the received request information based on the list of network elements and paths between the endstations.

31. An enterprise control point according to claim 30, further comprising a network interface adapted to communicate with a network control system server via a second signaling network, wherein the network interface is adapted to request reserved connections in a wide area network and/or broadband network.

32. An apparatus for providing reserved connections between endstations in a single broadband network, capable of providing best-effort and prioritized communications, comprising:

a switch in packet communication with a requesting one of the endstations that is adapted to detect and forward best-effort packets and packets that include requests for reserved connections according to a predetermined reservation protocol; and an enterprise control point adapted to communicate with the switch via a signaling channel and to communicate with a broadband network control system server via a signaling network, wherein the enterprise control point receives request information concerning reserved connections from the switch and to forward the request information to the broadband network control system server; and a premises switch in packet communication with the requesting endstation and the broadband network, the premises switch being adapted to communicate with the broadband network control system server via the signaling network and to forward packets belonging to reserved connections to a broadband network in response to reserved connection commands from the broadband network control system server.

33. An apparatus according to claim 32, wherein the premises switch comprises:

a packet switch adapted to perform packet forwarding decisions;

a network interface card adapted to transmit and/or receive packets to/from endstations via the packet switch; and a bonder adapted to receive and/or transmit packets to/from the broadband network.

*34. An enterprise control point, comprising:*

*a signaling interface configured to receive, from a switch via a signaling channel on a network, a request for a reserved connection between endstations according to a reservation protocol; and*

*a connection controller configured to identify a path within at least a portion of the network and reserve resources along the path in response to the request for the reserved connection;*

*wherein the switch is configured to detect and forward, between the endstations, best-effort packets and packets that include the request for the reserved connection according to the reservation protocol.*

*35. The enterprise control point of claim 34 wherein the connection controller is further configured to reserve the resources in the path according to bandwidth or quality of service requirements in the request.*

*36. The enterprise control point of claim 34 wherein the connection controller is further configured to identify the path by examining available paths in a path list.*

*37. The enterprise control point of claim 34 wherein the connection controller is further configured to reserve resources in the path by transmitting a bandwidth reservation message to the switch via the signaling channel using the signaling interface.*

*38. The enterprise control point of claim 37 wherein the bandwidth reservation message includes at least one of source address, destination address, or desired bandwidth.*

*39. The enterprise control point of claim 34 wherein the connection controller is further configured to update a list of existing connections in a connections list.*

*40. The enterprise control point of claim 34 wherein the reservation protocol includes a Reservation Protocol (RSVP).*

*41. The enterprise control point of claim 34 further including a discovery unit configured to identify the resources and paths between the resources in the network.*

*42. The enterprise control point of claim 41 wherein the discovery unit is configured to maintain a network elements registry of the resources and the paths between the resources.*

*43. The enterprise control point of claim 34 further including a connection monitor configured to maintain a permanent connection registry listing permanent connections in the network.*

*44. A method, comprising:*

*receiving, from a switch via a signaling channel on a network, a request for a reserved connection between at least two endstations according to a reservation protocol; and*

*identifying a path within at least a portion of the network and reserving resources along the path in response to the request for the reserved connection;*

*wherein the switch is configured to detect and forward, between the at least two endstations, best-effort packets and packets that include the request for the reserved connection according to the reservation protocol.*

*45. The method of claim 44 further comprising reserving the resources in the path according to bandwidth or quality of service requirements in the request.*

*46. The method of claim 44 further comprising identifying the path by examining available paths in a path list.*

*47. The method of claim 44 further comprising reserving resources in the path by transmitting a bandwidth reservation message to the switch via the signaling channel using the signaling interface.*

*48. The method of claim 47 wherein the bandwidth reservation message includes at least one of source address, destination address, or desired bandwidth.*

*49. The method of claim 44 further comprising updating a list of existing connections in a connections list.*

*50. The method of claim 44 wherein the reservation protocol includes a Reservation Protocol (RSVP).*

*51. The method of claim 44 further comprising identifying the resources and paths between the resources in the network.*

*52. The method of claim 51 further comprising maintaining a network elements registry of the resources and the paths between the resources.*

*53. The method of claim 44 further comprising maintaining a permanent connection registry listing permanent connections in the network.*

*54. An apparatus, comprising:*

*means for receiving, from a switch via a signaling channel on a network, a request for a reserved connection between endstations according to a reservation protocol; and*

*means for identifying a path within at least a portion of the network and for reserving resources along the path in response to the request for the reserved connection;*

*wherein the switch is configured to detect and forward, between the endstations, best-effort packets and packets that include the request for the reserved connection according to the reservation protocol.*

*55. The apparatus of claim 54 further comprising means for reserving the resources in the path according to bandwidth or quality of service requirements in the request.*

*56. The apparatus of claim 54 further comprising means for identifying the path by examining available paths in a path list.*

*57. The apparatus of claim 54 further comprising means for reserving resources in the path by transmitting a bandwidth reservation message to the switch via the signaling channel using the signaling interface.*

*58. The apparatus of claim 57 wherein the bandwidth reservation message includes at least one of source address, destination address, or desired bandwidth.*

*59. The apparatus of claim 54 further comprising means for updating a list of existing connections in a connections list.*

*60. The apparatus of claim 54 wherein the reservation protocol includes a Reservation Protocol (RSVP).*

*61. The apparatus of claim 54 further comprising means for identifying the resources and paths between the resources in the network.*

*62. The apparatus of claim 61 further comprising means for maintaining a network elements registry of the resources and the paths between the resources.*

*63. The apparatus of claim 54 further comprising means for maintaining a permanent connection registry listing permanent connections in the network.*

* * * * *

UNITED STATES PATENT AND TRADEMARK OFFICE

CERTIFICATE OF CORRECTION

PATENT NO. : RE43,566 E
APPLICATION NO. : 11/129747
DATED : August 7, 2012
INVENTOR(S) : Golden et al.

It is certified that error appears in the above-identified patent and that said Letters Patent is hereby corrected as shown below:

On Page 2, in Field (56), under "FOREIGN PATENT DOCUMENTS", in Column 1, Line 13, delete "JP 07-66834 3/1995".

On Page 2, in Field (56), under "FOREIGN PATENT DOCUMENTS", in Column 1, Line 16, delete "JP 08191308 7/1996".

On Page 2, in Field (56), under "FOREIGN PATENT DOCUMENTS", in Column 1, Line 19, delete "JP 09018489 1/1997".

On Page 2, in Field (56), under "OTHER PUBLICATIONS", in Column 1, Lines 1-3, delete "Ghanwani, A. et al., A Framework for Provising integrated Services Over Shared and Switched IEEE 802 LAN Technologies, Internet Engineering Task Force, Internet Draft, pp. 1-43 (May 1998).".

On Page 2, in Field (56), under "OTHER PUBLICATIONS", in Column 1, Lines 12-14, delete "Braden, R. et al., Resource ReSerVation Protocol (RSVP)--Version 1 Functional Specification, Network Working Group, pp. 1-99, (Sep. 1997).".

On Page 2, in Field (56), under "OTHER PUBLICATIONS", in Column 2, Lines 1-2, delete "Bernet, Y. et al., A Framework for Differentiated Services, Interent-Draft, Diffserv Working Group, pp. 1-25, (May 1998).".

On Page 2, in Field (56), under "OTHER PUBLICATIONS", in Column 2, Line 24, delete "(Globecom)." and insert -- (Globecom), --, therefor.

On Page 2, in Field (56), under "OTHER PUBLICATIONS", in Column 2, Lines 28-29, delete "Networks."" and insert -- Networks," --, therefor.

On Page 2, in Field (56), under "OTHER PUBLICATIONS", in Column 2, Line 42, delete "al," and insert -- al., --, therefor.

Signed and Sealed this
Twenty-sixth Day of February, 2013

Teresa Stanek Rea
*Acting Director of the United States Patent and Trademark Office*

On Page 3, in Field (56), under "OTHER PUBLICATIONS", in Column 2, Lines 4-7, delete "Yavatkat, R. et al., SBM (Subnet Bandwidth Manager): A Protocol for RSVP-based Admission Control Over IEEE 802-style networks, Internet Engineering Task Force, Internet Draft, pp. 1-61, (Nov. 1998).".

In the Drawings

In Fig. 3, Sheet 2 of 13, for Tag "26", in Lines 1-2, delete "PRIVAT NETWORK/VIRTUAL PRIVAT" and insert -- PRIVATE NETWORK/VIRTUAL PRIVATE --, therefor.

The drawing sheet(s) 2 of 13 consisting of fig(s) 4 should be deleted and substitute therefore the attached drawing sheets 2 of 13 consisting of fig(s) 4.

In Column 4, Line 51, delete "16," and insert -- 16 --, therefor.

In Column 13, Line 20, delete "requests.for" and insert -- requests for --, therefor.

In Column 13, Line 60, delete "ECP.50" and insert -- ECP 50 --, therefor.

In Column 16, Line 10, delete "QOS" and insert -- QoS --, therefor.

In Column 16, Line 43, delete "component." and insert -- component --, therefor.

In Column 20, Line 32, delete "16." and insert -- 16 --, therefor.

In Column 22, Line 19, delete "Ti" and insert -- T1 --, therefor.

In Column 22, Line 47, delete "reserved.connection" and insert -- reserved connection --, therefor.

In Column 23, Line 56, in Claim 1, delete "endstations," and insert -- endstations --, therefor.

In Column 26, Lines 44-45, in Claim 32, delete "single broadband network, capable of providing best-effort and prioritized communications," and insert -- broadband network, --, therefor.

In Column 26, Lines 48-49, in Claim 32, delete "and forward best-effort packets and".